(12) United States Patent
Schwartz et al.

(10) Patent No.: US 11,172,248 B2
(45) Date of Patent: Nov. 9, 2021

(54) SYSTEMS AND METHODS FOR CUSTOMIZING AND COMPOSITING A VIDEO FEED AT A CLIENT DEVICE

(71) Applicant: Tempus Ex Machina, Inc., San Francisco, CA (US)

(72) Inventors: Erik Schwartz, Los Altos Hills, CA (US); Michael Naquin, Alamo, CA (US); Grygorii Shcherbiak, San Francisco, CA (US); Kristopher Hanes, San Francisco, CA (US); Charles D. Ebersol, Los Angeles, CA (US)

(73) Assignee: Tempus Ex Machina, Inc., San Francisco, CA (US)

( * ) Notice: Subject to any disclaimer, the term of this patent is extended or adjusted under 35 U.S.C. 154(b) by 0 days.

(21) Appl. No.: 16/818,803

(22) Filed: Mar. 13, 2020

(65) Prior Publication Data

US 2020/0267441 A1    Aug. 20, 2020

Related U.S. Application Data

(63) Continuation-in-part of application No. 16/747,440, filed on Jan. 20, 2020, and application No. 62/802,186, Feb. 6, 2019.

(Continued)

(51) Int. Cl.
*H04N 21/00* (2011.01)
*H04N 21/431* (2011.01)
(Continued)

(52) U.S. Cl.
CPC ......... *H04N 21/4312* (2013.01); *H04N 5/272* (2013.01); *H04N 21/2187* (2013.01);
(Continued)

(58) Field of Classification Search
CPC .. H04N 5/272; H04N 21/4312; H04N 21/472; H04N 21/4532; H04N 21/44; H04N 21/8547; H04N 21/2187
See application file for complete search history.

(56) References Cited

U.S. PATENT DOCUMENTS 8,477,046 B2 * 7/2013 Alonso .................... H04Q 9/00
340/870.11
9,138,652 B1 * 9/2015 Thompson ....... H04N 21/23418
(Continued)

FOREIGN PATENT DOCUMENTS

WO    2018053257    3/2018

*Primary Examiner* — Zhihan Zhou
(74) *Attorney, Agent, or Firm* — Van Pelt, Yi & James LLP

(57) ABSTRACT

An embodiment of a process for providing a customized composite video feed at a client device includes receiving a background video feed from a remote server, receiving (via the communications interface) content associated with one or more user-specific characteristics, and determining one or more data elements based at least in part on the received content. The process includes generating a composite video feed customized to the one or more user-specific characteristics including by matching at least corresponding portions of the one or more data elements to corresponding portions of the background video feed, and displaying the composite video feed on a display device of the client device.

20 Claims, 18 Drawing Sheets

Related U.S. Application Data

(60) Provisional application No. 62/819,428, filed on Mar. 15, 2019, provisional application No. 62/795,020, filed on Jan. 22, 2019.

(51) Int. Cl.

| | | |
|---|---|---|
| *H04N 5/272* | (2006.01) | |
| *H04N 21/44* | (2011.01) | |
| *H04N 21/472* | (2011.01) | |
| *H04N 21/2187* | (2011.01) | |
| *H04N 21/8547* | (2011.01) | |
| *H04N 21/45* | (2011.01) | |

(52) U.S. Cl.
CPC ......... *H04N 21/44* (2013.01); *H04N 21/4532* (2013.01); *H04N 21/472* (2013.01); *H04N 21/8547* (2013.01)

(56) References Cited

U.S. PATENT DOCUMENTS

| | | | |
|---|---|---|---|
| 9,761,081 B2* | 9/2017 | Barclay | G07F 17/34 |
| 2013/0066448 A1* | 3/2013 | Alonso | H04Q 9/00 700/91 |
| 2015/0258416 A1 | 9/2015 | Ianni | |
| 2015/0297949 A1 | 10/2015 | Aman | |
| 2016/0101358 A1 | 4/2016 | Ibrahim | |
| 2016/0354633 A1 | 12/2016 | Schauermann | |
| 2017/0032191 A1 | 2/2017 | Ackland | |
| 2017/0201793 A1* | 7/2017 | Pereira | G06F 21/10 |
| 2017/0264920 A1 | 9/2017 | Mickelsen | |
| 2018/0199080 A1* | 7/2018 | Jackson, Jr. | H04N 21/2187 |
| 2018/0343489 A1* | 11/2018 | Loheide | H04N 21/6332 |
| 2019/0082233 A1 | 3/2019 | Love | |

\* cited by examiner

SYSTEMS AND METHODS FOR CUSTOMIZING AND COMPOSITING A VIDEO FEED AT A CLIENT DEVICE

CROSS REFERENCE TO OTHER APPLICATIONS

This application claims priority to U.S. Provisional Patent Application No. 62/819,428 entitled SYSTEMS AND METHODS FOR COMPOSITING A VIDEO FEED AT A CLIENT DEVICE filed Mar. 15, 2019.

This application is a continuation-in-part of U.S. patent application Ser. No. 16/747,440 entitled SYSTEMS AND METHODS FOR PARTITIONING A VIDEO FEED TO SEGMENT LIVE PLAYER ACTIVITY filed Jan. 20, 2020, which claims priority to U.S. Provisional Patent Application No. 62/795,020, entitled SYSTEMS AND METHODS FOR PARTITIONING A VIDEO FEED TO SEGMENT LIVE PLAYER ACTIVITY filed Jan. 22, 2019, and claims priority to U.S. Provisional Patent Application No. 62/802,186, entitled SYSTEMS AND METHODS FOR PARTITIONING A VIDEO FEED TO SEGMENT LIVE PLAYER ACTIVITY filed Feb. 6, 2019. The above-mentioned applications are incorporated herein by referenced for all purposes.

BACKGROUND OF THE INVENTION

Videos such as news broadcasts and sporting events such as football and soccer are some of the most popular forms on entertainment. A popular method is streaming a video feed on a user device. Conventional video streams use multiple data layers that are compiled remotely and communicated worldwide. For instance, a broadcasting booth receives and compiles video feeds, audio feeds, and graphics into a compiled video feed, which is then communicated to remote devices. The compiled video feed consumes a large amount of data, since the audio and graphics are inseparable from the video portion of the feed. Additionally, end users are unable to personalize the video feed since the end user can either receive the compiled video feed or choose not to receive the video feed at all, instead of optionally receiving portions of the video feed.

BRIEF SUMMARY

Techniques (including a system, a processor, and a computer program product) to provide a customized composite video feed are disclosed. In various embodiments, a process to customize and composite a video feed includes receiving a background video feed from a remote server, receiving content associated with one or more user-specific characteristics, and determining one or more data elements based at least in part on the received content. The process includes generating a composite video feed customized to the one or more user-specific characteristics including by matching at least corresponding portions of the one or more data elements to corresponding portions of the background video feed, and displaying the composite video feed on a display device of the client device.

In various embodiments, a process to process to customize and composite a video feed includes receiving a background video feed from a remote server, determining a first time stamp of a first frame of the background video feed from time-stamped metadata associated with the first frame, and receiving content associated with one or more user-specific characteristics. The content includes time-stamped metadata associated with background video frames and data with a time stamp falling within a time range determined by the first time stamp. The process includes determining one or more data elements based at least in part on the received content. The process includes generating a composite video feed customized to the one or more user-specific characteristics including by matching at least corresponding portions of the one or more data elements to corresponding portions of the background video feed based at least in part on a concordance of a time stamp of a respective data element and a time stamp of a respective background video frame. The process includes displaying the composite video feed on a display device of the client device. The generated composite video feed includes time-matched frames in which each time-matched frame is overlaid with data elements that time match a respective background video frame. Videos that are customized and compiled using the techniques disclosed herein are personalized to end users.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
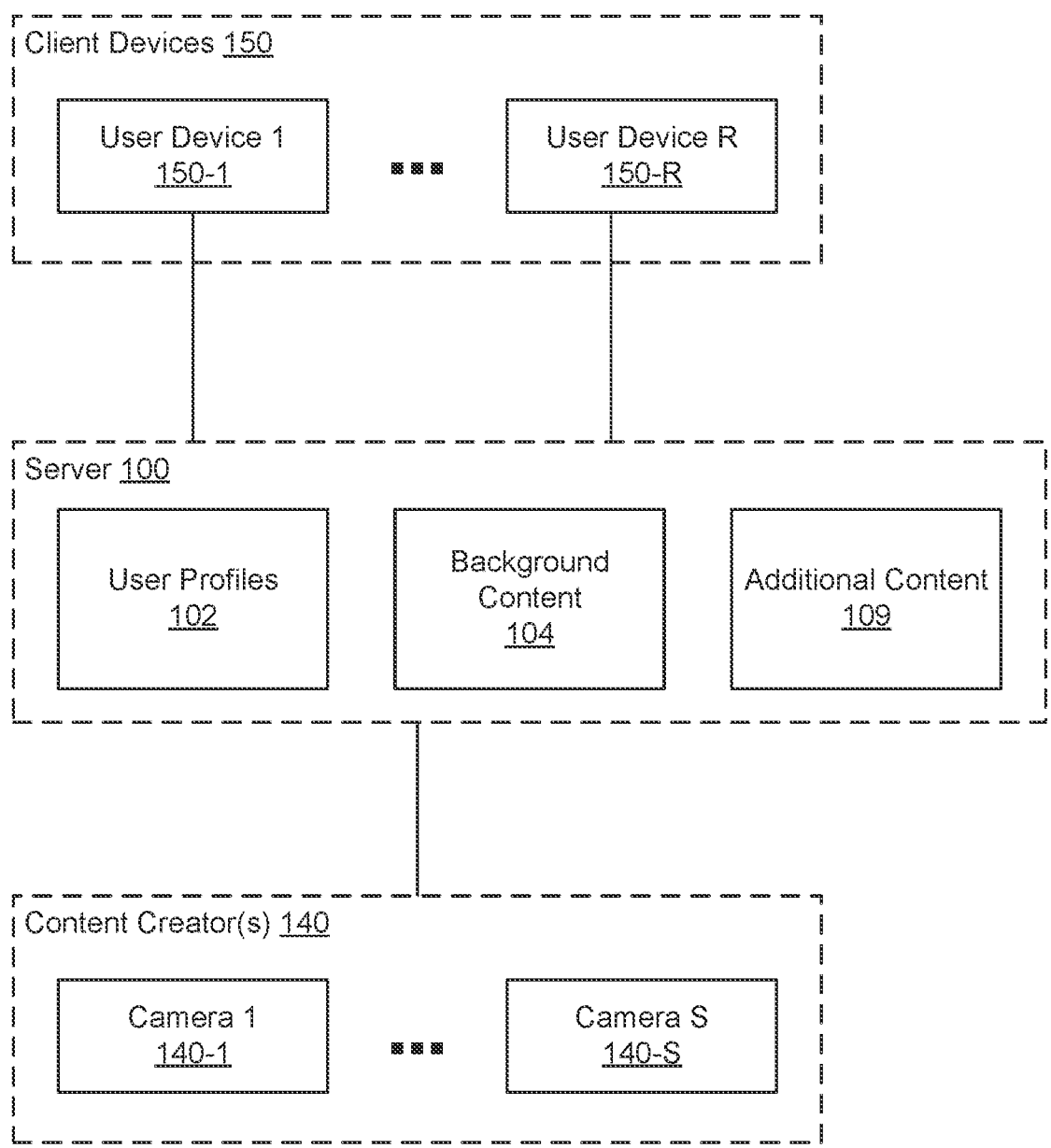
FIG. 1 is a block diagram illustrating an embodiment of a system to provide a customized composite video feed.

FIG. 1 is a block diagram illustrating an embodiment of a system to provide a customized composite video feed. This exemplary system includes one or more client devices 150, server 100, and one or more content creators 140. Each client device and content creator is configured to communicate with server 100 via a communications interface (not shown).

Figure 16:
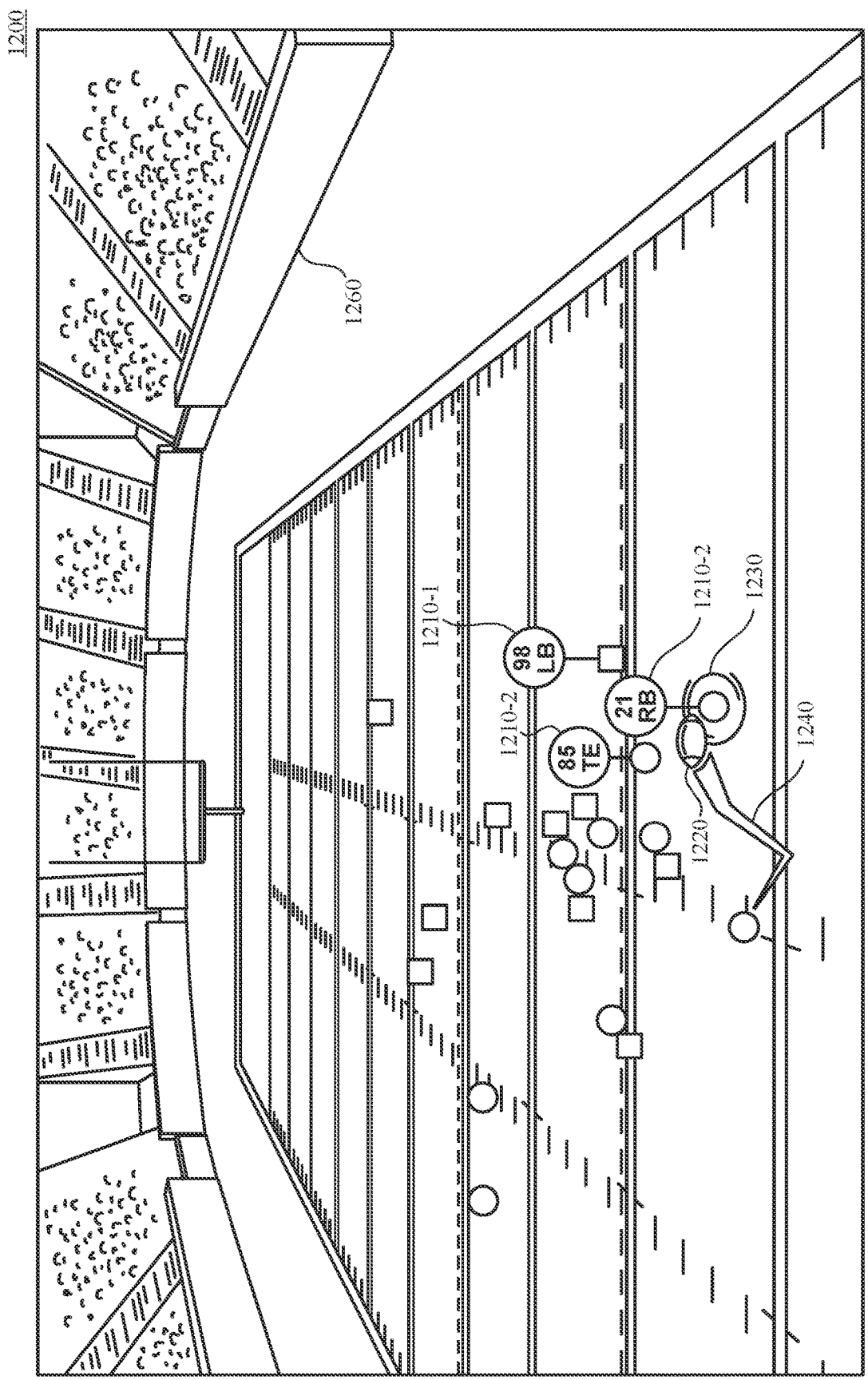
FIG. 16 shows an example of a customized composite video feed for a football game.

One or more user devices 150 facilitate end user interaction with various systems of the present disclosure. The user devices can be any type of computing device including, without limitation, a smartphone, tablet, OTT box, desktop computer, or smart TV. An example of a user device is shown in FIG. 16. The end user interacts with the other system components by sending a request to server 100 to view video content such as a news broadcast, live sporting event, or television program. The server responds with the requested content, and portions of the video feed can be customized to a specific user's preferences using the techniques further described below. In various embodiments, server 100 stores user profiles 102, which keeps track on user preference which may be based on user-specified interests (e.g., at the time of enrollment), user habits such as browsing history, and other user characteristics which may be learned over time using various techniques including known machine learning techniques. Server 100 also stores content that can be pushed to client devices periodically or sent to the client devices in response to a query for data. Background content 104 includes content created or captured by content creators 140 such as a background video feed as further described below. Additional content 109 includes data elements that can be used to augment the background video feed such as interactive data elements. The data elements can be extracted from the background video feed (e.g., isolating or highlighting footage of a specific player on a football team), generated (e.g., game/player stats) or a combination thereof.

As one example, User A watching a news broadcast is interested in a Company X's live stock price. Within User A's device, the news broadcast is presented and customized to display Company A's stock price. Suppose User B is not interested in Company X, but is instead interested in Company Y. Within User B's device, the news broadcast is presented and customized to display Company Y's stock price. As another example, User A is watching a live football game and is interested in Player U. Within User A's device, the football game is presented and customized to highlight Player U for example by displaying footage of the game focused on Player U's actions on the field. User B is not interested in Player U, but is instead interested in Player V. Within User B's device, the football game is presented and customized to highlight Player V.

One or more content creators 140 create content such as video, audio, text, images, and the like that is distributed to the client devices 150. By way of non-limiting example, content creators create news broadcasts such as finance news, television shows in a variety of areas such as reality television, and sporting events including live sports. For example, one or more cameras 140-1 to 140-S capture images and/or video of an event (which may be a live event) that is then utilized by the systems of the present disclosure. In some embodiments, the cameras 140 include one or more high resolution cameras. By way of non-limiting example, the one or more high resolution cameras includes a camera with a 1080p resolution to 8K resolution.

The above-identified components are interconnected, optionally through a communications network. Elements in dashed boxes are optional combined as a single system or device. Of course, other topologies of the computer system are possible. For instance, in some implementations, any of the illustrated devices and systems can in fact constitute several computer systems that are linked together in a network, or be a virtual machine or a container in a cloud computing environment. Moreover, in some embodiments rather than relying on a physical communications network, the illustrated devices and systems wirelessly transmit information between each other. As such, the exemplary topology shown in FIG. 1 merely serves to describe the features of an embodiment of the present disclosure in a manner that will be readily understood to one of skill in the art.

Now that a general topology of the system has been described, methods for compositing and customizing a video feed (e.g., video presentation) at a client device will be described.

Figure 2:
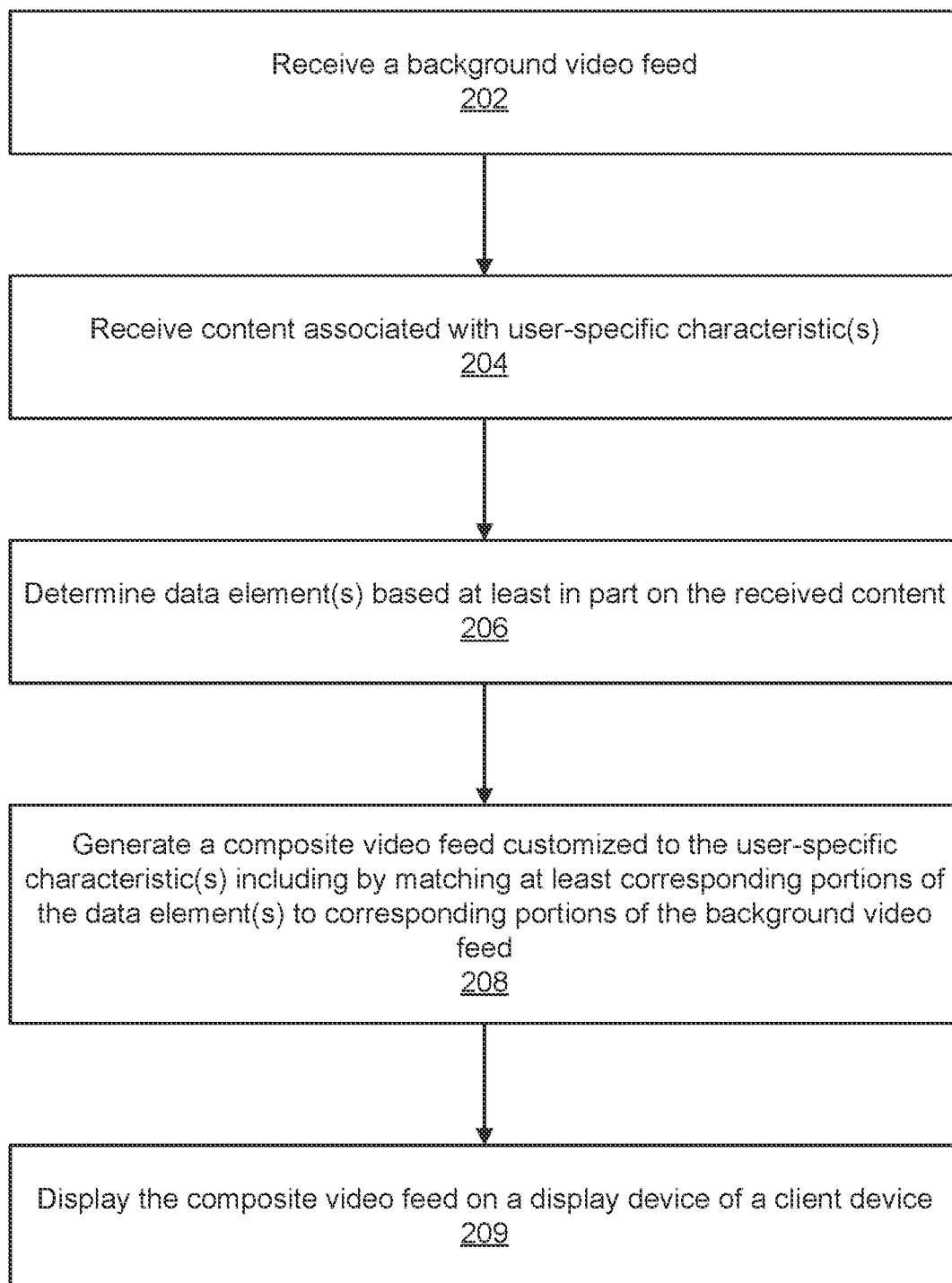
FIG. 2 is a flow chart illustrating an embodiment of a process for customizing and compositing a video feed.

FIG. 2 is a flow chart illustrating an embodiment of a process for customizing and compositing a video feed. The process can be performed by a client device such as User Device 1 (150-1) or User Device R (150-R) shown in FIG. 1.

The process begins by receiving a background video feed (202). The background video feed can be any type of content including, without limitation, a live event, a new broadcast, or an advertisement. The video feed of a live event is received while the live event is taking place or the video feed of the event is received after the live event has taken place (e.g., the video feed is a video on demand (VOD)), such as a recording of the live event. An example of a news broadcast is further described with respect to FIGS. 4A and 4B. An example of a live sports event is further described with respect to FIGS. 5A-5C.

In some embodiments, the video feed includes an audio portion (e.g., audio captured by a respective broadcasting device 140). Accordingly, in some embodiments the video feed received by a respective client device includes a composition of frames and audio (e.g., the video feed received by the client device includes audio portions and image portions). However, the present disclosure is not limited thereto. For instance, in some embodiments the respective client device receives a video feed (e.g., a plurality of frames) and an audio feed (e.g., a plurality of audio segments or portions) as separate feeds. Splitting an audio portion of the video feed prior to receiving the feeds at the respective user device allows for an end-user of the user device to customize, enable, or disable, audio portions and/or closed captioning portions of the composited video feed depending on the user preference settings of the user. For example, the audio sound track (various languages, background music, narration, etc.) can be tailored to the user's characteristics. The background video feed can be received together with the content received at 204 or can be received separately (not in association) with the content received at 204.

The process receives content associated with one or more user-specific characteristics (204). The client device receives the content from the remote server. The customization can be performed by the server and/or the client device. In some embodiments, the client device determines what content to request based on user-specific characteristics. For example, the client device looks up content associated with a user's preferences locally and sends a request for content of interest to the server. In some embodiments, it is the server that determines what content to send based on user-specific characteristics. For example, the client sends a user identifier (such as user name or a demographic group) to the server, and the server uses the user identifier to look up content of interest to the user by using a lookup table or other database that maps a user's characteristics to content of interest to that specific user.

In various embodiments, the content is pushed to client devices by the server at an interval determined by the server and/or user/client device settings. In various embodiments, content is pulled from the server by the client device using a content request. For example, the client device uses a communications interface to request the content from a remote server. In various embodiments, the request is automatically made on behalf of a user when the user begins using the user device (or a client application on the user device). For example, when a user logs into a fantasy sports app, a television show viewing app, or the like, the request for content is relayed to the server. In various embodiments, the request is initiated by the user via a user interface on the client device. For example, while viewing a television program using the client device, the user selects an object of interest such as a player or team in a sporting event, a company stock ticker symbol, a character in reality TV show to generate a request for content (additional information) about the object of interest.

In some embodiments, the plurality of data elements received from the computer system includes the plurality of data elements requested by the query. However, the present disclosure is not limited thereto. For instance, in some embodiments a first plurality of data elements is requested by the query and, accordingly, a second plurality of data elements is received from the computer system (e.g., only a subset of data elements of the first plurality of data elements is available). Nevertheless, as further described below, in some embodiments each data element that is received in response to the query includes associated time-stamped metadata that falls (e.g., is included) within the specific time range (e.g., the time range is from 1:04 PM to 1:06 PM on a specific day, and, accordingly, the data elements received as a result of the query include metadata that is associated with a time in between 1:04 PM and 1:06 PM of the specific day). In some embodiments, the plurality of data elements is received from one or more data stores of the system shown in FIG. 1, 6, or 10 (e.g., historical training data store 214, situation store 228, etc.). In some embodiments, the plurality of data elements is stored locally on the user device. In some embodiments, the plurality of data elements includes one or more data elements that are stored locally on the user device and one or more data elements that are stored on the computer system shown in FIG. 1, 6, or 10 (e.g., historical data store 214, situation store 228, etc.).

The process determines one or more data elements based at least in part on the received content (206). The data elements can be determined based on preference settings (e.g., user preference settings) of the client device. For instance, a user preference setting indicates that the user is interested in weather, so weather data elements will be included in a composite video feed. The data elements can be interactive, allowing user to select the data element to view additional customized content to the user's preferences. Thus, the query includes a request for weather data elements which are overlaid with the frames of the video feed. The user preference settings can be stored within the user device or at a remote server.

User preference settings can be determined in a variety of ways. For example, a machine learning process determines a tendency of a particular setting by analyzing an activity of a user over a period of time. As another example, user interaction with an affordance region of a graphical data element overlaid on a video feed indicates a user preference. A user interacts with a graphical data element (e.g., embedded graphic), such as touching a scrolling ticker on a video feed to obtain more information about the ticker or to change a state of the graphical data element from visible to OFF. Having the query request data elements in accordance with a user preference setting allows for the composited video feed to be personalized for the respective user. This querying also optimizes an amount of data received by the respective user device since data elements a user indicates to exclude (or does not request) are not received by the user device. Further, enabling an end user to interact with a composited video feed and change which data elements are overlaid onto the feed allows for the end user to further personalize the viewing experience.

The process generates a composite video feed customized to the user-specific characteristics including by matching at least corresponding portions of the one or more data elements to corresponding portions of the background video feed (208). Data elements can be matched to corresponding portions of the background video feed asynchronously or in a time-synchronized manner as further described below.

The process displays the composite video feed on a display device of the client device (209). The composite video feed can be output on a user interface of a client device to show information tailored to a specific user's interests in conjunction (e.g., overlaid) with a background video feed that is broadcast to a general audience.

In some embodiments, communications (the receiving steps 202 and 206 and requesting step 204) are performed using a first exchange protocol, which provides a communication system for receiving portions of a background video feed and assembling data elements and/or portions of the video feed to form composited video feed (e.g., a video presentation). In some embodiments, the first exchange protocol is a HyperText Transfer Protocol (HITP) Live Streaming protocol (e.g., an HLS protocol). In some embodiments, the first exchange protocol is a real-time messaging protocol (RTMP). In some embodiments, the first exchange protocol delays (e.g., induces a latency in) receiving the video feed by a dynamic period of time (e.g., of from 10 seconds to 60 seconds).

In some embodiments, the background video feed is continuously received (e.g., a respective client device is in continuous communication with the computer system shown in FIG. 1 to receive the video feed). In some embodiments, the video feed is received by a respective user device in packets or blocks (e.g., the respective user devices the video feed in 10 second blocks). In various embodiments, time-synchronized matching is performed as further described with respect to FIG. 15.

In some embodiments, the receiving of the video feed, the sending of the content request, or a combination thereof is conducted in accordance with a determination of a bandwidth of the client device. For instance, in some embodiments a bandwidth of the client device is dynamic and changes depending upon a number of factors (e.g., a bandwidth of network, a bandwidth of broadcasting system, etc.).

In some embodiments, the method further includes using the bandwidth of the client device (e.g., user device 150) to dimension a size of a visualization buffer (e.g., visualization buffer module). In some embodiments, the using the bandwidth of the client device to dimension a size of the visualization buffer increases the size of the visualization buffer responsive to a determination in a degradation in the bandwidth. Moreover, the using the bandwidth of the client device to dimension a size of the visualization buffer reduces the size of the visualization buffer responsive to a determination of an improvement in the bandwidth. This dimensioning of a size of the visualization buffer allows for a number of time matched frames to be dynamically posted to the visualization buffer. For instance, in some embodiments decreasing a number of time matched frames posted to the visualization buffer decreases a load on the client device.

In some embodiments, the receiving of the video feed, the sending of the query, or a combination thereof is conducted in accordance with a determination of a bandwidth of the client device. For instance, in some embodiments a bandwidth of the client device is dynamic and changes depending upon a number of factors (e.g., a bandwidth of network 106, a bandwidth of broadcasting system 150, etc.).

Figure 3:
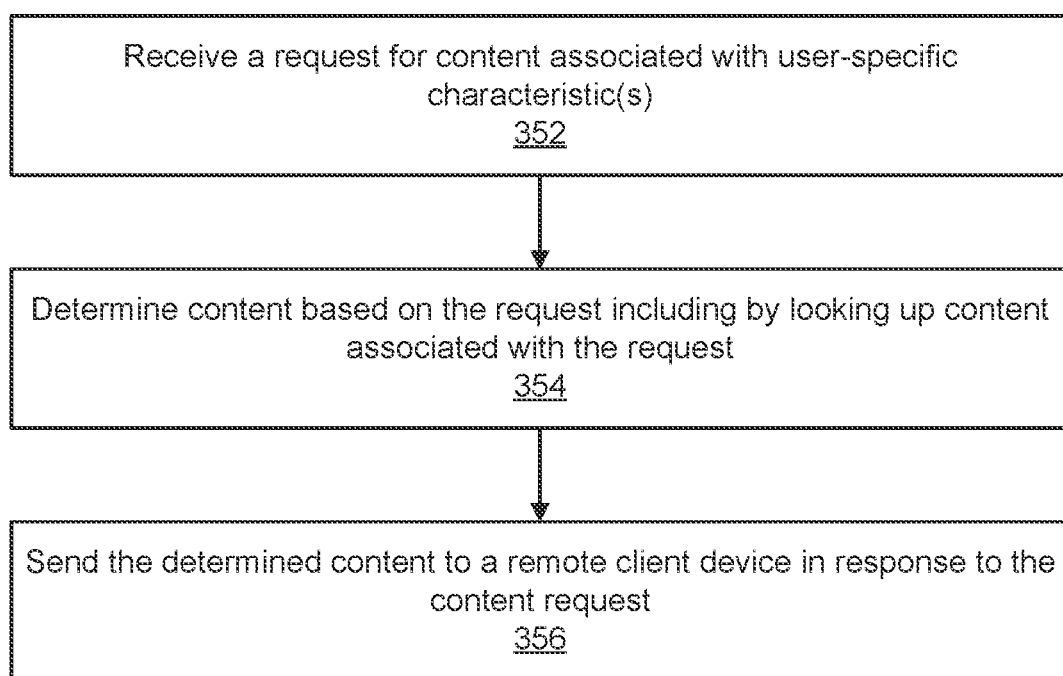
FIG. 3 is a flow chart illustrating an embodiment of a process for customizing and compositing a video feed.

FIG. 3 is a flow chart illustrating an embodiment of a process for customizing and compositing a video feed. The process can be performed by a server such as server 100 shown in FIG. 1.

The process begins by receiving a request for content associated with one or more user-specific characteristics (352). The server uses a communications interface to receive and send data to a remote client device.

The process determine content based on the request including by looking up content associated with the request (354). The content may include data and/or metadata, where the data can be directly output or post-processed by the client for output in the composite video feed. By way of non-limiting example, data includes graphics, text, or audio. Metadata defines how the data is to be output in the composite video feed such as a visual effect (such as an alpha glow), a speed, a direction, refresh rate, exit conditions, and interaction rules.

The process can keep track of requests or user preferences by using profiles. For example, if the request is accompanied by user-specific characteristics, the characteristics are stored in a user profile that keeps track of a particular user's interests and/or behaviors. As described above, in some embodiments, the server uses a user identifier sent by the client device to look up content of interest to the user by using a lookup table or other database that maps a user's characteristics to content of interest to that specific user.

The process sends the determined content to a remote client device in response to the content request (356). The content can be sent over any type of communications interface or network.

The process for customizing and compositing a video feed finds application in a variety of settings. The following figures show an example of a news broadcast.

Figure 4A:
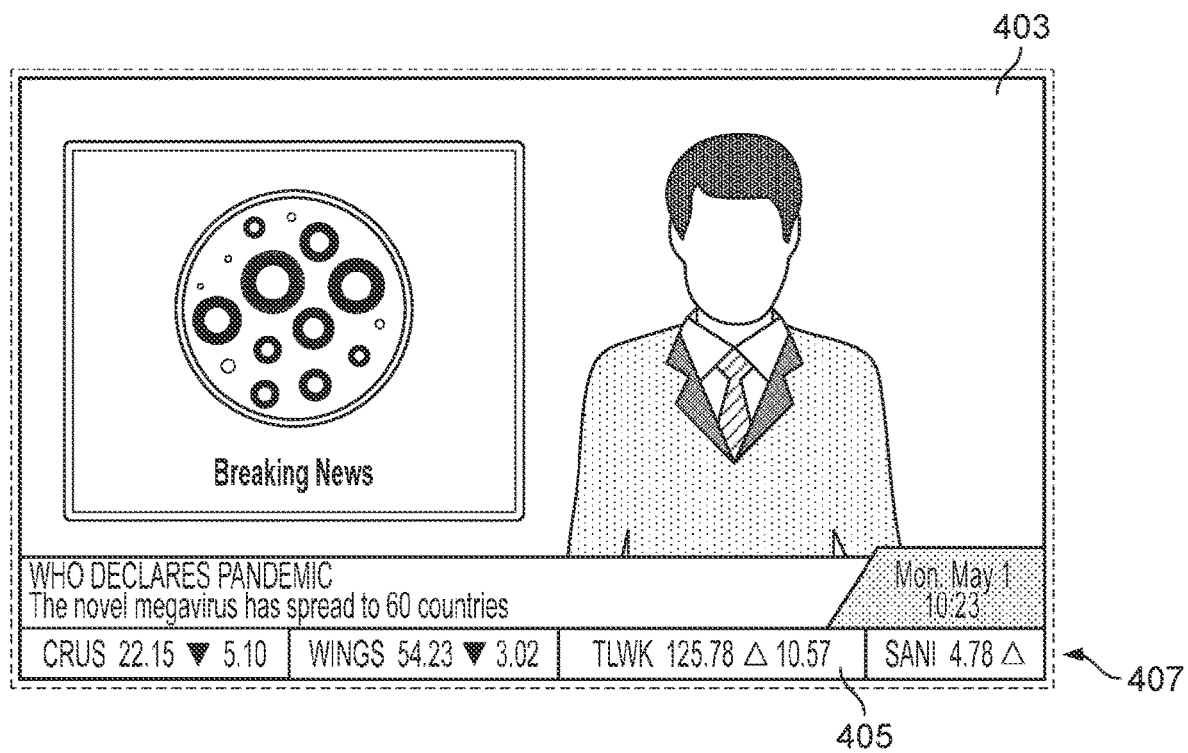
FIG. 4A shows an example of a news broadcast that is customized and composited at a client device.

FIG. 4A shows an example of a news broadcast that is customized and composited at a client device. In this example, the customized data element is a scroll of text displayed in a newscast. The background video 403 is of a news announcer reading breaking news about a development in global public health. The newscast can be pre-recorded or live, and the techniques for customization can be applied in either situation. As shown, the background video has various portions including an inset frame ("Breaking News") that can display additional video such as content from reporters in the field interviewing various people.

A bottom text scroll 407 shows current stock prices. The breaking news has an impact on stock prices of various companies, decreasing the prices of a cruise line (CRUS) and an airline (WINGS) while increasing the prices of a teleworking company (TLWK) and a cleaning supplies company (SANI). A user viewing the newscast may be particularly interested in some of the companies, for example if he is an investor in TLWK (represented by data element 405).

The text scroll 407 is an example of a data element that is an example of data element(s) matched to a portion of the background video feed. Together, the background video 403 and the text scroll 407 forms a composite video. A user can interact with this video to obtain further information of interest. For example, the user can select data element 405 to display additional video or information pertaining to TLWK as shown in the next figure.

A video timestamp instantiates the text scroll (crawl). Data for the crawl is periodically requested from the server based on an individual user profile and the video timestamp, downloaded to the client, and then rendered locally. Formatting for the crawl can be included as markup. Behavior of the crawl (speed, direction, interaction rules, refresh period, exit conditions (what makes the crawl go away)) can be included in the download as various code commands.

Figure 4B:
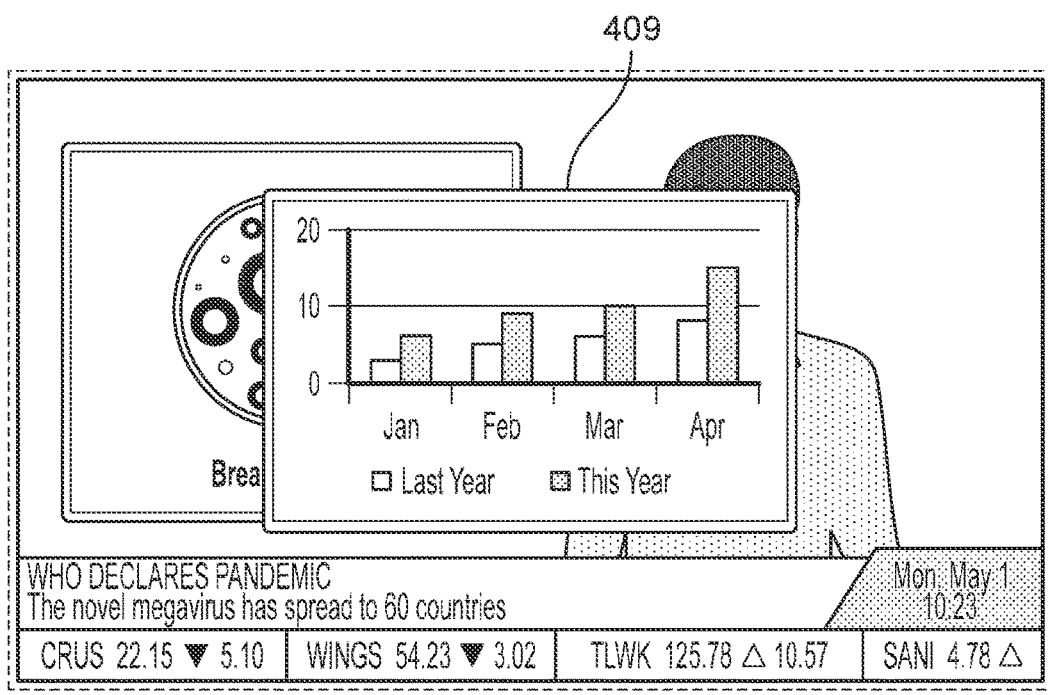
FIG. 4B shows an example of a news broadcast that is customized and composited at a client device.

FIG. 4B shows an example of a news broadcast that is customized and composited at a client device. In this example, the customized data element is a branched video that displays an in-depth report about a subject of interest to the user. A background video feed or a composite video feed can be updated in response to user interaction with the one or more data elements (e.g., a specific stock ticker) of the composite video feed. FIG. 4B shows a state of the user interface after the user has selected data element (module)

405. The modules such as the frame elements are locally rendered data. Formatting for the modules can be embedded markup. When a user touches or clicks on one of the modules (data element 405), it triggers the opening of a new video stream (e.g., data element 409). A chart of the company's sales this year compared with the same time frames as last year is displayed. The chart can be accompanied by other multi-media such as narration explaining when TLWK share prices are rising. The manner in which the customized data element is displayed is merely illustrative and not intended to be limiting. For example, data element 409 can be displayed in other portions of the user interface such as the "Breaking News" inset, can fill the entire screen, or can be snapped to take up more/less space in the user interface. Other customized data elements can be displayed as well. For example, a user can view a data element about TLWK and another data element about SANI simultaneously. This allows a user to follow many objects/subject matters of interest while still viewing the background video. For example, the user can study the in-depth report about TWLK while background video plays and when another breaking news item affects SANI's stock prices, then the user can easily exit out of the TWLK in-depth report and turn his attention to SANI.

The data elements can be other types of multimedia such as audio track in a language and/or music customized to a specific user. As another example, the background video feed can be an advertisement and a data element such as a price (e.g., a text string) can be customized/targeted to the user for example based on the user's geographical location (taxes may differ from region to region) or based on cost of living or perceived value of a specific user.

The process for customizing and compositing a video feed finds application in a variety of settings. The following figures show an example of a live sports event.

Figure 5A:
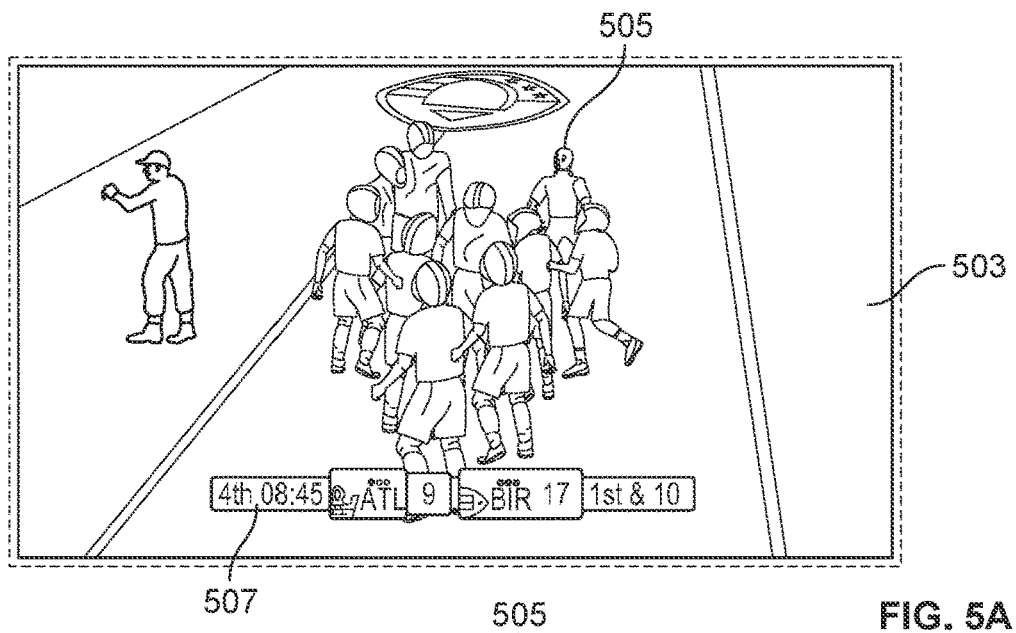
FIG. 5A shows an example of a sports event that is customized and composited at a client device.
Figure 5B:
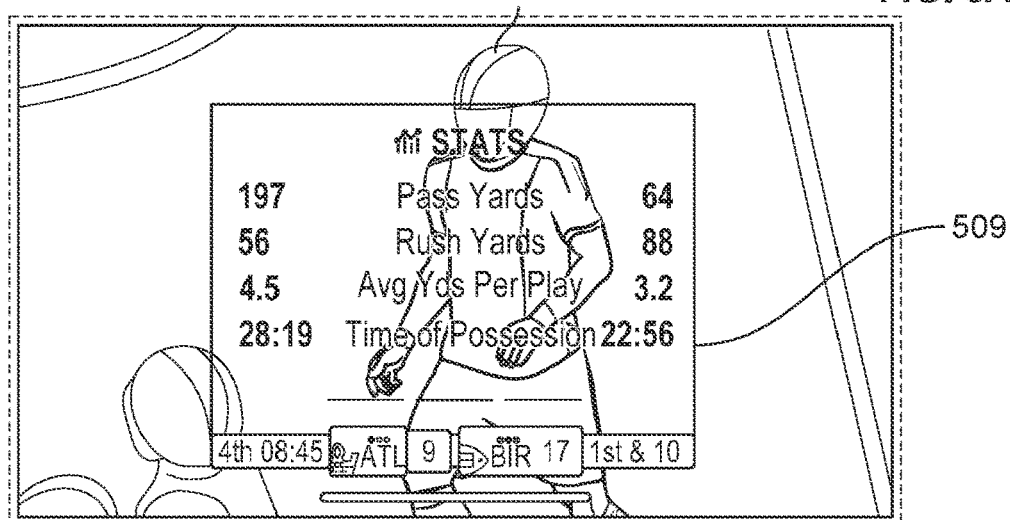
FIG. 5B shows an example of a sports event that is customized and composited at a client device.
Figure 5C:
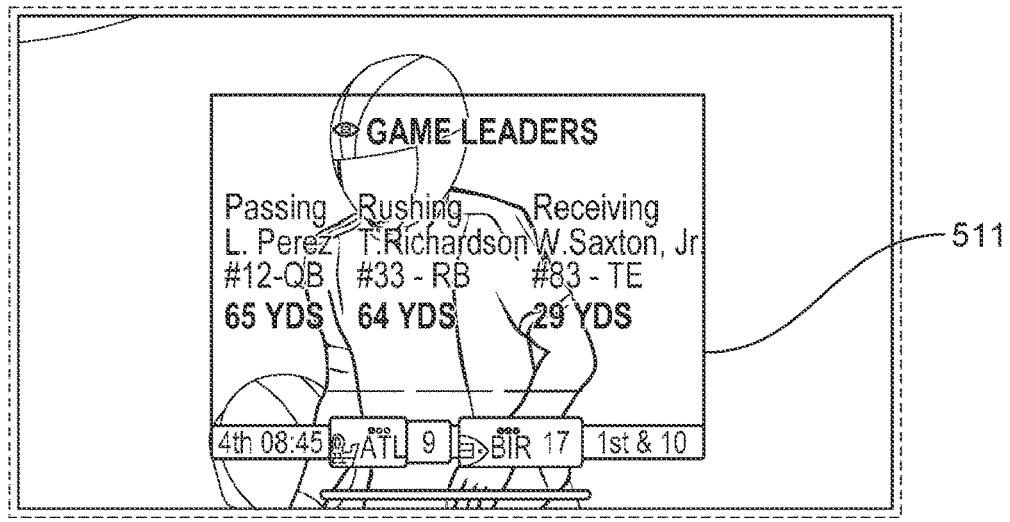
FIG. 5C shows an example of a sports event that is customized and composited at a client device.

FIGS. 5A-5C shows an example of a sports event that is customized and composited at a client device. In some embodiments the live event is a sports event (e.g., a sports event between a first team and a second team). For instance, in some embodiments the live event is a football game, a soccer game, a tennis match, a water polo game, etc. between a first team and a second team. The video feed includes a plurality of frames (e.g., frames captured by a respective camera 140). The video feed can include a static number of frames (e.g., 16, 24, 28, or 60 frames per second) or a dynamic number of frames. The dynamic number of frames per second of video can be in accordance with a bandwidth of network and/or client device.

User preference settings indicate a preference for one or more graphical data elements (e.g., 509 or 511) to be overlaid onto a video feed (503) and/or an orientation or preferred camera of a video feed. For instance, in some embodiments a user preference setting indicates that the user prefers to receive a video feed from a first camera (e.g., a landscape camera view) instead of a second camera (e.g., a partial landscape camera view). Moreover, a user preference setting indicates a preference to display a graphical data element 509 that identifies various information related to a respective subject 505. A user preference setting indicates a preference to display a graphical data elements including for example a location of a ball (e.g., positional information of a ball), a current ball carrier, path of travel of a subject (e.g., a path of travel of a ball during a play), game clock data element 507, a play clock data element, and/or a game state data element.

In some embodiments, a user preference setting indicates a preference to display a graphical data element that provides a wagering platform (e.g., wager module 718). In some embodiments, a user preference setting indicates a preference to display a data element that provides text based information (e.g., weather information, news, etc.). Thus, a user is enabled to personalize and interact with a video feed to tailor the viewing experience to their particular preferences. This also allows for the user device to optimize an amount of data received from the computer system (e.g., the system shown in FIG. 1) by preventing streams of data a user has indicated no interest in from being communicated unnecessarily.

The plurality of data elements includes a plurality of game clock data elements (e.g., an array of game clock elements and associated metadata), game state data elements (e.g., an array of game state elements and associated metadata), positional information data elements (e.g., an array of positional information for one or more subjects and associated metadata), graphical data elements (e.g., a plurality of embedded graphics, a plurality of text data elements such as news and/or weather, and associated metadata), text data elements (e.g., new articles, weather information, etc.), score of the sporting event at the matching time stamp value, etc.

The plurality of data elements may include one or more arrays of data elements. For instance, in some embodiments the plurality of data elements includes an array of game clock data and associated time-stamps. In some embodiments the plurality of data elements includes an array of play clock data and associated time-stamps. In some embodiments, each data element in the plurality of data elements is provided as an array of data. Nevertheless, Table 1 depicts an exemplary array of game clock data elements, an exemplary array of game state data elements, and time stamp metadata associated with each respective array that is stored by the computer system shown in FIG. 1.

TABLE 1

Exemplary Array of Game Clock Data Elements
and Game State Data Elements

| Exemplary Game Clock Data Elements (quarter:minutes:seconds) | Exemplary Game State Date Elements (current down) | Exemplary Time Stamped Metadata (hours:minutes:seconds) |
| --- | --- | --- |
| 1:15:00 | 1st down | 00:00:00 |
| 1:14:59 | 1st down | 00:00:01 |
| 1:14:58 | 1st down | 00:00:02 |
| 1:14:58 | 2nd down | 00:00:03 |
| 1:14:58 | 2nd down | 00:00:04 |
| 1:14:57 | 2nd down | 00:00:05 |
| 1:14:56 | 3rd down | 00:00:06 |
| 1:14:55 | 3rd down | 00:00:07 |
| 1:14:54 | 1st down | 00:00:08 |
| 1:14:54 | 1st down | 00:00:09 |
| 1:14:54 | 1st down | 00:00:10 |

The techniques disclosed herein find application in a sporting event streaming setting. The following figures show examples of systems and processes for capturing a background video feed, and determining content that can be displayed in a customized manner with the background video feed to cater to a user's preferences.

Figure 6:
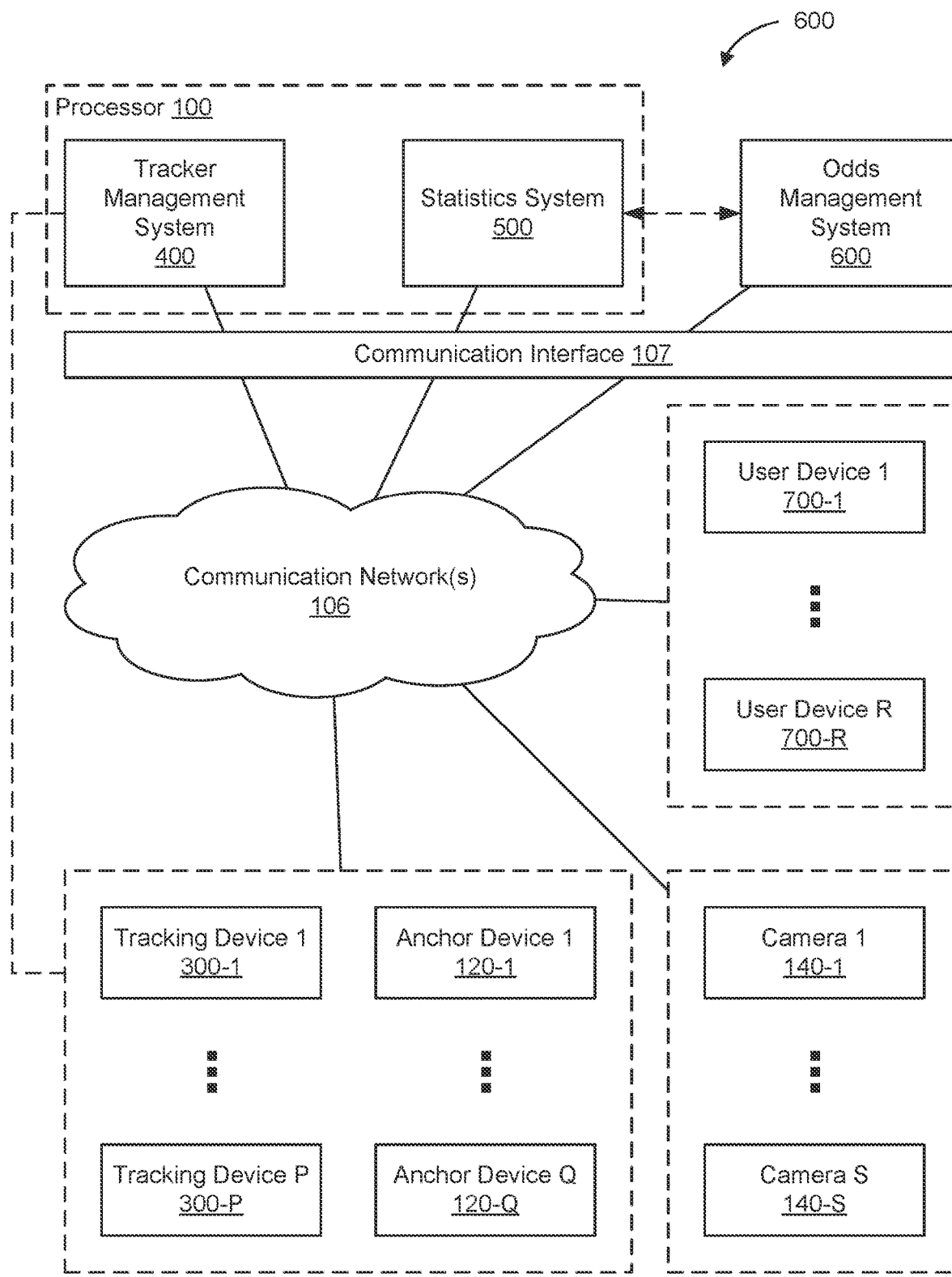
FIG. 6 is a block diagram illustrating an embodiment of a system for customizing and compositing a video feed.

FIG. 6 is a block diagram illustrating an embodiment of a system for customizing and compositing a video feed. System 600 includes additional elements compared with FIG. 1 to facilitate video customization and composition for live sports events. System 600 includes communication interface 107 and processor 100 (which is like server 100 of FIG. 1 unless otherwise described). Communication interface 107 is configured to receive time-stamped position information of one or more participants of one or both of the first set of participant(s) and the second set of participant(s) in the competition. In various embodiments, the time-stamped position information is captured by a telemetry tracking system during the competition. In this example, the telemetry tracking system is made up of tracking device(s) 300-1 to 300-P, anchor device(s) 120-1 to 120-Q, and optionally camera(s) 140-1 to 140-S, which are managed by tracker management system 400 as further described below.

Processor 100 is coupled to communication interface 107 and configured to calculate, e.g., while the present competition is ongoing, a first covariate parameter for each of one or more participants in one or both of the first set of participants and the second set of participants at and/or as of a point in time. Each respective first covariate parameter is derived from the time-stamped position information of a corresponding participant of the first or second set of one or more participants in the present competition at the point in time.

In various embodiments, processor 100 includes tracking management system 400 for tracking a plurality of subjects and statistics system 500 for managing various statistics. Tracking device management system 400 facilitates managing of one or more tracking devices 300 and one or more anchor devices 120 of the system. Statistics system 500 stores and/or generates various statistics for use in predicting an outcome at a competition such as a live sports event, providing odds for wagering on various circumstances or outcomes in the sports event, and other similar activities. In various embodiments, tracking management system 400 and statistics system 500 comprise software engines or modules running on processor 100 and/or separate or potentially separate systems, each comprising and/or running on one or more processors comprising processor 100.

In various embodiments, system 600 includes odds management system 600 for managing odds and a plurality of user devices 700-1 to 700-R. Although odds management system 600 is shown external to processor 100, in some embodiments the odds management system is included in the processor. Odds management system 600 facilitates determining odds for outcomes in a sports event and managing various models related to predicting outcomes at the live event.

In some embodiments, the system includes one or more user devices 700 that facilitate end user interaction with various systems of the present disclosure, such as odds management system 600. Moreover, in some embodiments, system 600 includes one or more cameras 140 that capture live images and/or video of a live event that is then utilized by the systems of the present disclosure. In some embodiments, the cameras 140 include one or more high resolution cameras. By way of non-limiting example, the one or more high resolution cameras includes a camera with a 1080p resolution, 1440p resolution, 2K resolution, 4K resolution, or 8K resolution.

The above-identified components are interconnected, optionally through a communications network. Elements in dashed boxes are optional combined as a single system or device. Of course, other topologies of the computer system 600 are possible. For instance, in some implementations, any of the illustrated devices and systems can in fact constitute several computer systems that are linked together in a network, or be a virtual machine or a container in a cloud computing environment. Moreover, in some embodiments rather than relying on a physical communications network 106, the illustrated devices and systems wirelessly transmit information between each other. As such, the exemplary topology shown in FIG. 6 merely serves to describe the features of an embodiment of the present disclosure in a manner that will be readily understood to one of skill in the art.

In some implementations, the communication network 106 interconnects tracking device management system 400 that manages one or more tracking devices 300 and one or more anchors 120, statistics system 500, odds management system 600, one or more user devices 700, and one or more cameras 140 with each other, as well as optional external systems and devices. In some implementations, the communication network 106 optionally includes the Internet, one or more local area networks (LANs), one or more wide area networks (WANs), other types of networks, or a combination of such networks.

Examples of networks 106 include the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In various embodiments, processor 100 includes a machine learning engine 210 (see FIG. 7A) that facilitates the prediction of the outcome of a competition. The next figure describes an example of processor 100 that includes a machine learning engine in greater detail.

Figure 7A:
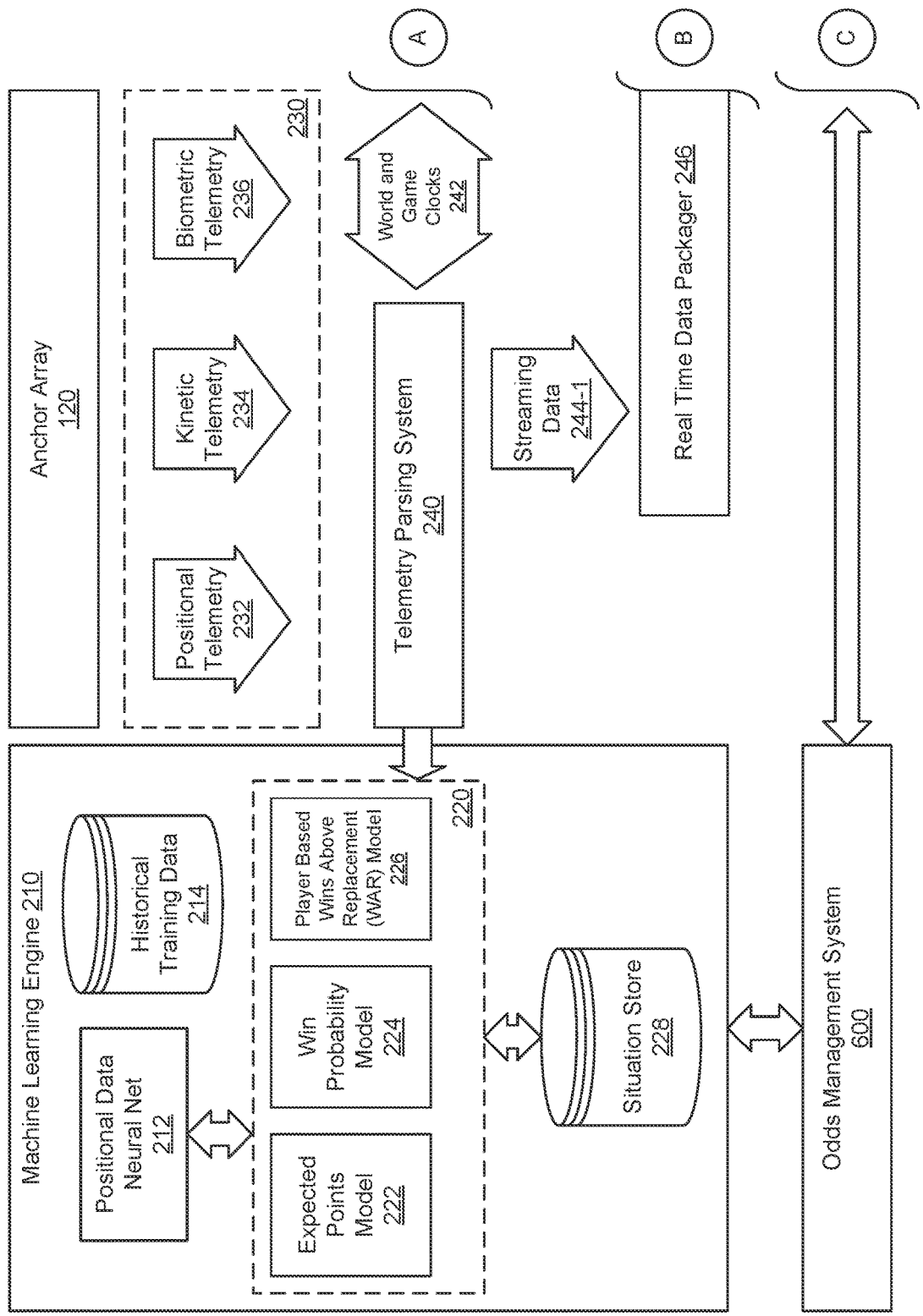
FIG. 7A shows a block diagram illustrating an embodiment of a system for customizing and compositing a video feed.
Figure 7B:
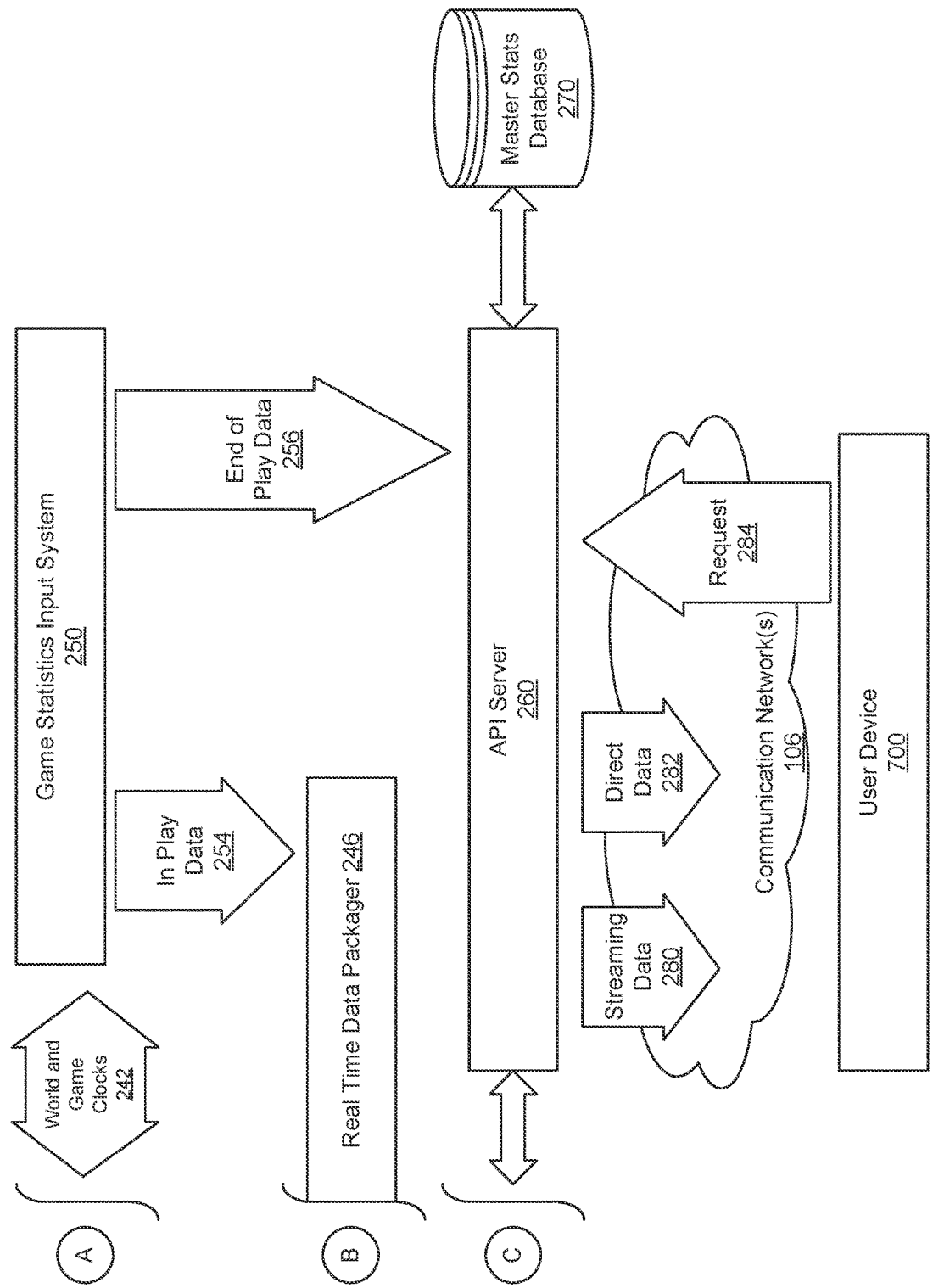
FIG. 7B shows a block diagram illustrating an embodiment of a system for customizing and compositing a video feed.

FIGS. 7A and 7B show a block diagram illustrating an embodiment of a system for customizing and compositing a video feed. As depicted in FIG. 7A, an array of anchor devices 120 receives telemetry data 230 from one or more tracking devices 300. In order to minimize error in receiving the telemetry from the one or more tracking devices 300, the array of anchor devices 120 preferably includes at least three anchor devices. Inclusion of at least three anchor devices 120 within the array of anchor devices allow for each ping (e.g., telemetry data 230) received from a respective tracking device 300 to be triangulated using the combined data from the at least three anchor that receive the respective ping. Additional details and information regarding systems and methods for receiving pings from tracking devices and the optimization thereof will be described in more detail infra, with particular reference to at least FIGS. 3 and 4.

In the example shown, the telemetry data 230 that is received by the array of anchors 120 from the one or more tracking devices 300 includes positional telemetry data 232. The positional telemetry data 232 provides location data for a respective tracking device 300, which describes a location of the tracking device within a spatial region. In some embodiments, this positional telemetry data 232 is provided as one or more Cartesian coordinates (e.g., an X coordinate, a Y coordinate, and/or Z a coordinate) that describe the position of each respective tracking device 300, although any coordinate system (e.g., polar coordinates, etc.) that describes the position of each respective tracking device 300 is used in alternative embodiments.

The telemetry data 230 that is received by the array of anchors 120 from the one or more tracking devices 300 includes kinetic telemetry data 234. The kinetic telemetry data 234 provides data related to various kinematics of the respective tracking device. In some embodiments, this kinetic telemetry data 234 is provided as a velocity of the respective tracking device 300, an acceleration of the respective tracking device, and/or a jerk of the respective tracking device. Further, in some embodiments one or more of the above values is determined from an accelerometer (e.g., accelerometer 317 of FIG. 8) of the respective tracking device 300 and/or derived from the positional telemetry data 232 of the respective tracking device. Further, in some embodiments the telemetry data 230 that is received by the array of anchors 120 from the one or more tracking devices 300 includes biometric telemetry data 236. The biometric telemetry data 236 provides biometric information related to each subject associated with the respective tracking device 300. In some embodiments, this biometric information includes a heart rate of the subject, temperature (e.g., a skin temperature, a temporal temperature, etc.), and the like.

In some embodiments, the array of anchors 120 communicates the above described telemetry data (e.g., positional telemetry 232, kinetic telemetry 234, biometric telemetry 236) to a telemetry parsing system 240. Accordingly, in some embodiments the telemetry parsing system 240 communicates the telemetry data (e.g., stream of data 244) to a machine learning engine 210 and/or a real time data packager 246 for further processing and analysis.

In some embodiments, the real time data packager 246 synchronizes one or more data sources (e.g., streaming data 244 from telemetry parsing system 240, game statistics input system 250, machine learning engine 210, etc.) by using one or more timestamps associated with the respective data. For instance, in some embodiments the data sources provide data that is associated with a real world clock timestamp (e.g., an event occurred at and is associated with a real world time of 1:17 P.M.). In some embodiments, the data sources provide data that is associated with a game clock timestamp related to a live sports event (e.g., an event occurred with 2 minutes and 15 seconds remaining in the second quarter). Moreover, in some embodiments the data sources provide data that is associated with both the real world clock timestamp and the game clock timestamp. Synchronization of the data sources via timestamps allows for a designer of the present disclosure to provide services with an additional layer of accuracy, particularly with betting and wagering on outcomes at a live event. For instance, in some embodiments data provided to a user device 700 (e.g., streaming data 280 and/or direct data 282 of FIG. 7B) describes the wagering (e.g., odds) on a next play in a football game. In order to determine if an end user of the user device 700 places a wager within a predetermined window of time (e.g., before the snap of the ball of the next play), the game clock and real world time data received from the user device and/or communicated to the user device are analyzed and the wager is either validated, rejected, or held for further consideration.

In some embodiments, machine learning engine 210 receives data from various sources of the present disclosure in order to predict a future outcome at a live sporting event and generate statistics for analysis and use. For instance, in some embodiments the data sources of the machine learning engine 210 includes a positional data formation classifier 212, hereinafter "neural net," that provides information related to various configurations and formations of players at any given point of time in game. For instance, in some embodiments the formation classifier 212 parses the telemetry data 230 to analyze pre-snap formations of players. The analyses of the pre-snap telemetry data 230 allows for the formation classifier 212 to determine various states and conditions of the game, such as a down of a game, a positional rule violation within a game (e.g., off-sides, illegal motion, etc.), and the like. Moreover, in some embodiments the formation classifier 212 analyzes telemetry data 230 that is received subsequent the start of the play in order to further generate data and information related to how each formation evolves (e.g., an expected running route versus an actual running route, an expected blocking assignment versus an action blocking assignment, a speed of a player throughout a play, a distance between two players throughout a play, etc.).

In some embodiments, machine learning engine 210 includes a historical training data store 214. Historical data store 214 provides historical data and information related to each particular sport (e.g., sports historical data 508 of FIG. 10), each particular team associated with the particular sport (e.g., team historical data 510 of FIG. 10), and/or each particular player associated with the particular sport and/or team (e.g., player historical data 514 of FIG. 10). In some embodiments, this data is initially used as a training data set for the machine learning engine 210. However, the present disclosure is not limited thereto as this data may also be used to further augment the features and services provided by the machine learning engine 210 and other systems of the present disclosure.

Further, in some embodiments the machine learning engine 210 includes a variety of models 220 that are utilized to predict a future outcome of a sporting event and provide analysis of the sporting event. In some embodiments, the models 220 of the machine learning engine 210 include an expected points model 222. The expected points model 222 provides a likelihood of receiving points for a particular play at the event via a numerical value. In some embodiments, the models 220 of the machine learning engine 210 include a win probability model 224 that provides either a likelihood of each participating team of the event to win or a likelihood of any given point spread between the winning and losing teams at the event. Furthermore, in some embodiments the models 220 of the machine learning engine 210 include a player based wins above replacement (WAR) model 226. The WAR model 226 provides a contribution value a respective player adds to their corresponding team (e.g., player 1 provides a value of 1 to a respective team and player two provides a value of 2 to the respective team, therefore player two is worth more to the respective team).

In some embodiments, machine learning engine 210 include a situation store 228. The situation store 228 is a cache of various situational details and/or statistics that is accessed rapidly during a real game scenario. Rapid access to the situation store 228 prevents lag that would otherwise be induced from querying different databases and systems (e.g., positional data formation classifier 212, historical training data 214, etc.) in order to obtain the same information. Additional details and information regarding the machine learning engine and the components therein, including the various above described data stores and models, will be described in more detail infra, with particular reference to at least FIGS. 10 and 11.

Machine learning engine 210 communicates various odds and outputs of the various databases and models therein to an odds management system 600. In communicating with the machine learning engine 210, the odds management system 600 provides various wagers and predictive odds for future events at a sporting event to the user devices 700, while also updating these odds in real time to reflect current situations and statistics of a game.

As depicted in FIG. 7B, in some embodiments system 600 includes a game statistics input system 250. The game statistics input system 250 is configured for providing at least in play data 254, which, in example case of football, describes a state of the game during a given play (e.g., a weak side receiver ran a post route), as well as end of play data 256, which describes a state of the game after a given play (e.g., a play resulted in a first down at the opponents 42-yard line). In some embodiments, the data of the statistics input system 250 is associated with the world and game clock 242, and accordingly is communicated to the telemetry parsing system 240 and/or the machine learning engine 210. In some embodiments the game statistics input system 250 is subsumed by the formation classifier 212.

In some embodiments, various data is communicated to an application programming interface (API) server 260. This data may include streaming data 244, end of play data 256, data from the odds management system 600, or a combination thereof. Accordingly, the API server 260 facilitates communication between various components of the system, one or more user devices 700, and a master statistics database 270 in order to provide various features and services of the present disclosure (e.g., a stream of the game, a request for statistics, placing a wager on a play, etc.). Communication between the API server 260 and the one or more user devices 700 includes providing streaming data 280 and/or direct data 282 to each respective user device 700 through the communications network 106, as well as receiving various requests 284 from each respective user device. By way of non-limiting example, streaming data 280 includes tracking "telemetry" data including xyz coordinates of players or accelerometer data of players, direct data 282 includes clock, score, or remaining timeouts.

In some embodiments, the master statistics database 270 includes some or all of the statistics known to the machine learning engine 210 that are obtainable to a user. The master statistics database is updated regularly such as at the end of every play or every few plays. For instance, in some embodiments only a portion of the statistics known to the machine learning engine 210 is desired to be obtainable by a user, and thus is stored in the master statistics database 270. However, the present disclosure is not limited thereto. For instance, in some embodiments the master statistics database 270 is subsumed by the machine learning engine 270. Elements in dashed boxes are optional combined as a single system or device.

Now that an infrastructure of the system 600 has been generally described, an exemplary tracking device 300 will be described with reference to FIG. 3.

Figure 8:
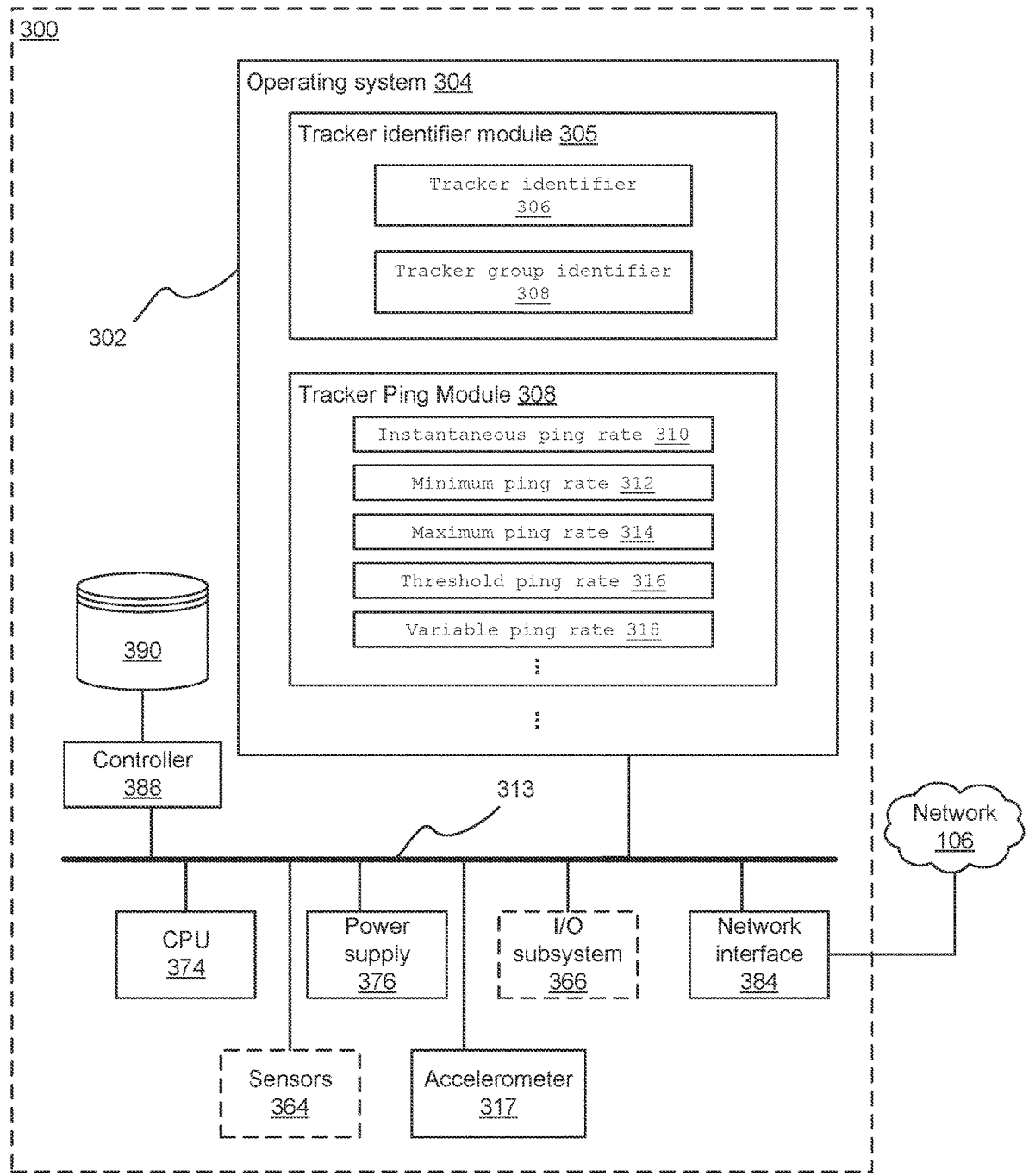
FIG. 8 is a block diagram illustrating an embodiment of a tracking device.

FIG. 8 is a block diagram illustrating an embodiment of a tracking device. In various implementations, the tracking device, hereinafter also a "tracker," includes one or more processing units (CPUs) 374, a memory 302 (e.g., a random access memory), one or more magnetic disk storage and/or persistent device 390 optionally accessed by one or more controllers 388, a network or other communications interface (which may include RF circuitry) 384, an accelerometer 317, one or more optional intensity sensors 364, an optional input/output (I/O) subsystem 366, one or more communication busses 313 for interconnecting the aforementioned components, and a power supply 376 for powering the aforementioned components. In some implementations, data in memory 302 is seamlessly shared with non-volatile memory 390 using known computing techniques such as caching. In some implementations, memory 302 and/or memory 390 may in fact be hosted on computers that are external to the tracking device 300 but that can be electronically accessed by the tracking device 300 over an Internet, intranet, or other form of network or electronic cable (illustrated as element 106 in FIG. 7) using network interface 384.

In various embodiments, the tracking device 300 illustrated in FIG. 8 includes, in addition to accelerometer(s) 317, a magnetometer and/or a GPS (or GLONASS or other global navigation system) receiver for obtaining information concerning a location and/or an orientation (e.g., portrait or landscape) of the tracking device 300.

It should be appreciated that the tracking device 300 illustrated in FIG. 8 is only one example of a device that may be used for obtaining telemetry data (e.g., positional telemetry 232, kinetic telemetry 234, and biometric telemetry 236) of a corresponding subject, and that the tracking device 300 optionally has more or fewer components than shown, optionally combines two or more components, or optionally has a different configuration or arrangement of the components. The various components shown in FIG. 8 are implemented in hardware, software, firmware, or a combination thereof, including one or more signal processing and/or application specific integrated circuits.

Memory 302 of the tracking device 300 illustrated in FIG. 8 optionally includes high-speed random access memory and optionally also includes non-volatile memory, such as one or more magnetic disk storage devices, flash memory devices, or other non-volatile solid-state memory devices. Access to memory 302 by other components of the tracking device 300, such as CPU(s) 374 is, optionally, controlled by the memory controller 388.

In some embodiments, the CPU(s) 374 and memory controller 388 are, optionally, implemented on a single chip. In some other embodiments, the CPU(s) 374 and memory controller 388 are implemented on separate chips.

Radio frequency (RF) circuitry of network interface 384 receives and sends RF signals, also called electromagnetic signals. In some embodiments, the RF circuitry 384 converts electrical signals to from electromagnetic signals and communicates with communication networks and other communications devices, such as the one or more anchor devices 120 and/or the tracking device management system 400, via the electromagnetic signals. The RF circuitry 384 optionally includes well-known circuitry for performing these functions, including but not limited to an antenna system, a RF transceiver, one or more amplifiers, a tuner, one or more oscillators, a digital signal processor, a CODEC chipset, a subscriber identity module (SIM) card, memory, and so forth. On some embodiments, the RF circuitry 384 optionally communicates with the communication network 106.

In some embodiments, the network interface (including RF circuitry) 384 operates via ultra-wide band (UWB) technology, which allows for the tracking device 300 to communicate with an array of anchor devices 120 in a crowded spatial region, such as a live sporting event. In some embodiments, the tracking device 300 transmits a low power (e.g., approximately 1 milliwatt (mW)) signal at a predetermined center frequency (e.g., 6.55 GHz±200 mHz, yielding a total frequency range of transmission of approximately about 6.35 GHz to about 6.75 GHz). As used herein, these communications and transmissions are hereinafter referred to as a "ping." For a discussion of UWB, see Jiang et al, 2000, "Ultra-Wide Band technology applications in construction: a review," Organization, Technology and Management in Construction 2(2), 207-213.

In some embodiments, the power supply 358 optionally includes a power management system, one or more power sources (e.g., a battery, a recharging system, a power failure detection circuit, a power converter or inverter, a power status indicator (e.g., a light-emitting diode (LED)) and any other components associated with the generation, management and distribution of power in such tracking devices 300. In some embodiments, the telemetry data 230 includes information related to the power supply 358 of the respective tracking device 300, such as a battery consumption or an expected period of time until the tracking device requires more power.

In some implementations, the memory 302 of the tracking device 300 for tracking a respective subject stores:

an operating system 304 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;

a tracking device identifier module 305 that stores data used to identify the respective tracking device 300 including a tracking device identifier 306 and an optional tracking device group identifier 307; and a tracking device ping module 308 that stores data and information related to a ping rate of the respective tracking device, the tracking device ping module 308 including:

an instantaneous ping rate 310 that describes a current ping rate a respective tracking device 300 is currently operating at, a minimum ping rate 312 that describes a minimum ping rate a respective tracking device 300 may operate at, a maximum ping rate 314 that describes a maximum ping rate a respective tracking device 300 may operate at, a threshold ping rate 316 that describes a minimum ping rate a respective tracking device 300 may operate at, and a variable ping rate flag 318.

The tracking device identifier module 305 stores information that relates to identifying the respective tracking device 300 from a plurality of tracking devices (e.g., tracking device 1 300-1, tracking device 2 300-3, . . . , tracking device P 300-P). In some embodiments, the information stored by the tracking device identifier module 305 includes a tracking device identifier (ID) 306 that includes a unique ID (e.g., a serial number or a code) representing the respective tracking device 300. In some embodiments, the tracking device ID module 305 includes a tracking device group ID 307 that designates the respective tracking device 300 to one or more groups of tracking devices (e.g., tracking device group 418-2 of FIG. 9). Further, in some embodiments pings communicated by the respective tracking device 300 includes data of the tracking device ID module 305, allowing for an array of anchor devices 120 to identify pings received from more than one tracking device. Additional details and information regarding the grouping of a tracking device 300 will be describe in more detail infra, with particular reference to at least FIG. 9.

The tracking device ping module 308 stores data and information related to various ping parameters and conditions of respective tracking device 300, as well as facilitating management of the ping. For instance, in some embodiments the tracking device ping module 308 manages an instantaneous ping rate 310 of the respective tracking device 300 (e.g., managing an instantaneous ping rate 310 to be 10 Hertz (HZ)). In some embodiments, the tracking device 300 is configured with one or more ping rate limits, including one or more both of a minimum ping rate 312 and a maximum ping rate 314, that define a maximum and a minimum ping rate that the tracking device 300 may transmit pings. For instance, in some embodiments the minimum ping rate 312 and/or the maximum ping rate 314 may be set by the tracking device management system 400 based upon one or more of bandwidth limitations, a number of active tracking devices 300, and a type of expected activity (e.g., a sport and/or event types, an expected subject activity, etc.). When configured with one or both ping rate limits, the tracking device ping module 308 operates to adjust the instantaneous ping rate 310 between the minimum ping rate 312 and the maximum ping rate 314. Thus, automatic optimization of tracking management system 400 may be used in combination with automatic ping rate adjustment of tracking device 300. In some embodiments, tracking device ping module 308 is configured to compare detected motion from accelerometer 317 to a predefined threshold 316. Accordingly, the ping module 308 increases the instantaneous ping rate 310 in accordance with a determination that the detected motion is greater than predefined threshold 316 (e.g., until the instantaneous ping rate 310 reaches the maximum ping rate 314). Likewise, the ping module 308 decreases the instantaneous ping rate 310 (e.g., until the instantaneous ping rate 310 reaches the minimum ping rate 312) in accordance with a determination that the detected motion is less than the threshold ping rate 316.

In some embodiments, the ping module 310 includes a variable ping rate flag 318, which is configured (e.g., set wirelessly) by the tracking device management system 400, that determines whether ping module 308 automatically, or not, changes the instantons ping rate 310 based upon determined activity. For example, the tracking device management system 400 may set variable ping rate flag 318 to "false" for one or more tracking devices 300 that is associated with a player not currently participating on the field of play, wherein instantaneous ping rate 310 remains at a low rate even if the player is actively warming up for example. Tracking device management system 400 sets variable ping rate flag 318 to "true" for one or more players that is actively participating on the field of play. Furthermore, in some embodiments each tracking device 300 is dynamically configured based upon a location of the respective tracking device. For instance, in accordance with a determination that a tracking device 300 is within a field of play (e.g., if a player is actively participating in a game) as opposed to a determination that the tracking device is off the field of play (e.g., if a player is not actively participating in a game).

Utilizing the tracking device ping model 308 and/or the sensor (e.g., accelerometer 317 and/or optional sensors 364) within tracking device 300 increases reliability of the system 600 (e.g., the array of anchors 120, the telemetry parsing system 240, the tracking device management system 400, etc.) to track subjects disposed with the tracking device.

As previously described, in some embodiments each tracking device 300 provides telemetry data 230 that is received and communicated by various anchors 120 that are proximate to the respective tracking device 300. This telemetry data includes positional telemetry data 232 (e.g., X, Y, and/or Z coordinates), kinetic telemetry data 234 (e.g., velocity, acceleration, and/or jerk), and/or biometric telemetry data 236 (e.g., heart rate, physical attributes of a player such as shoulder width, etc.).

In some embodiments, each subject in the game is equipped with more than one tracking device 300 in order to increase the accuracy of the data received from the tracking devices about the subject. For instance, in some embodiments the left shoulder and the right shoulder of a respective subject are both equipped with a tracking device 300, each such tracking device functioning normally and having line of site to at least a subset of the anchors 120. Accordingly, in some embodiments the data from the left and right tracking devices 300 have their telemetry data 230 combined to form a single time-stamped object. This single object combines positional data from both tracking devices 300 to create a center line representation of a position of the respective player. Moreover, this center line calculated position provides a more accurate representation of the center of a player's position on the playing field. Further, using the relative positional data from two tracking devices 300 positioned on the left and right shoulders of a player, prior to creating the single player object as described above, allows the system 600 to determine a direction (e.g., a rotation) that the player is facing. In various embodiments, including rotational data greatly eases the task of creating avatars from data created by recording telemetry data 230 during a game and/or establishing sophisticated covariates that can be used to better predict future events in the game or the final outcome of the game itself.

In some embodiments, the tracking device 300 has any or all of the circuitry, hardware components, and software components found in the device depicted in FIG. 8. In the interest of brevity and clarity, only a few of the possible components of the tracking device 300 are shown to better emphasize the additional software modules that are installed on the tracking device 300.

Figure 9:
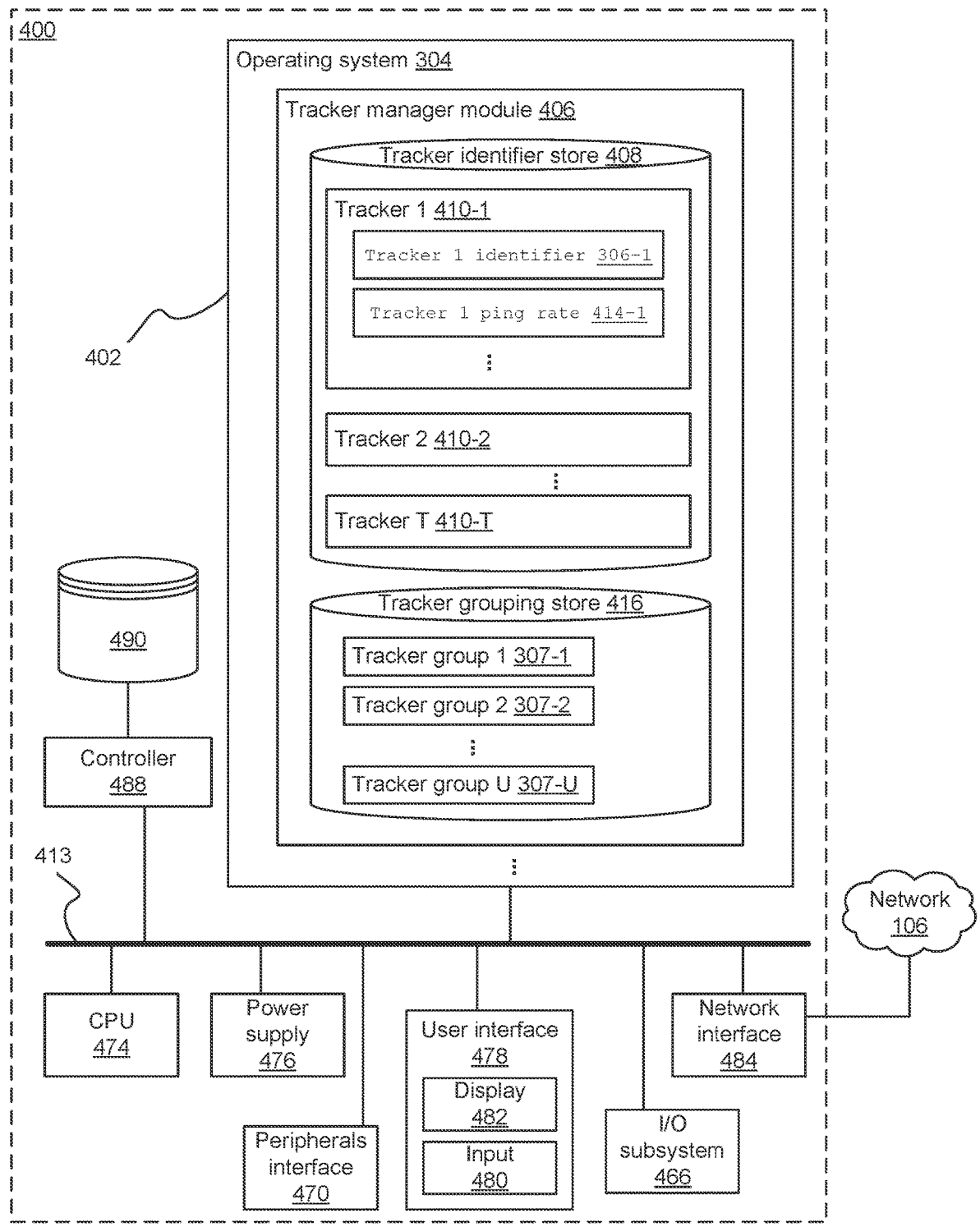
FIG. 9 is a block diagram illustrating an embodiment of a tracking device management system.

FIG. 9 is a block diagram illustrating an embodiment of a tracking device management system. Tracking device management system 400 is associated with one or more tracking devices 300 and anchors 120. The tracking device management system 400 includes one or more processing units (CPUs) 474, a peripherals interface 470, a memory controller 488, a network or other communications interface 484, a memory 402 (e.g., random access memory), a user interface 478, the user interface 478 including a display 482 and an input 480 (e.g., a keyboard, a keypad, a touch screen, etc.), an input/output (I/O) subsystem 466, one or more communication busses 413 for interconnecting the aforementioned components, and a power supply system 476 for powering the aforementioned components.

In some embodiments, the input 480 is a touch-sensitive display, such as a touch-sensitive surface. In some embodiments, the user interface 478 includes one or more soft keyboard embodiments. The soft keyboard embodiments may include standard (QWERTY) and/or non-standard configurations of symbols on the displayed icons.

It should be appreciated that tracking device management system 400 is only one example of a system that may be used in engaging with various tracking devices 300, and that tracking device management system 400 optionally has more or fewer components than shown, optionally combines two or more components, or optionally has a different configuration or arrangement of the components. The various components shown in FIG. 9 are implemented in hardware, software, firmware, or a combination thereof, including one or more signal processing and/or application specific integrated circuits.

Memory 402 optionally includes high-speed random access memory and optionally also includes non-volatile memory, such as one or more magnetic disk storage devices, flash memory devices, or other non-volatile solid-state memory devices. Access to memory 402 by other components of the management system 400, such as CPU(s) 474 is, optionally, controlled by memory controller 488.

Peripherals interface 470 can be used to couple input and output peripherals of the management system to CPU(s) 474 and memory 402. The one or more processors 474 run or execute various software programs and/or sets of instructions stored in memory 402 to perform various functions for the management system 400 and to process data.

In some embodiments, peripherals interface 470, CPU(s) 474, and memory controller 488 are, optionally, implemented on a single chip. In some other embodiments, they are, optionally, implemented on separate chips.

In some embodiments, power system 476 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 9, memory 402 of the tracking device management system preferably stores:
  an operating system 404 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components; and
  a tracking device manager module 406 for facilitating management of one or more tracking devices 300, the tracking device manager module including:
    a tracking device identifier store 408 for storing pertinent information related to each respective tracking device 410-1 including a tracking device identifier 306 and a tracking device ping rate 414, and
    a tracking device grouping store 416 for facilitating management of or more tracking device groups 307.

The tracking device identifier store 408 includes information related to each respective tracking device 410-1, including the tracking device identifier (ID) 306 for each respective tracking device 300 as well as a tracking device group 307 to which the respective tracking device is associated. For instance, in some embodiments a first tracking device group 307-1 is associated with the left shoulder of each respective subject and a second tracking device group 307-2 is associated with a right shoulder of each respective subject. Moreover, in some embodiments a third tracking device group 307-3 is associated with a first position (e.g., receiver, defensive end, safety, etc.) of each respective subject and a fourth tracking device group 307-4 is associated with a second position. Grouping 307 of the tracking devices 300 allows for a particular group to be designated with a particular ping rate (e.g., a faster ping rate for running backs). Grouping 307 of the tracking devices 300 also allows for a particular group to be isolated from other tracking devices that are not associated with the respective group, which is useful in viewing representations of the telemetry data 230 provided by the tracking devices of the group. Additional information related to tracking devices and tracking device management systems is found in U.S. Pat. No. 9,950,238, entitled "Object Tracking System Optimization and Tools."

Figure 10:
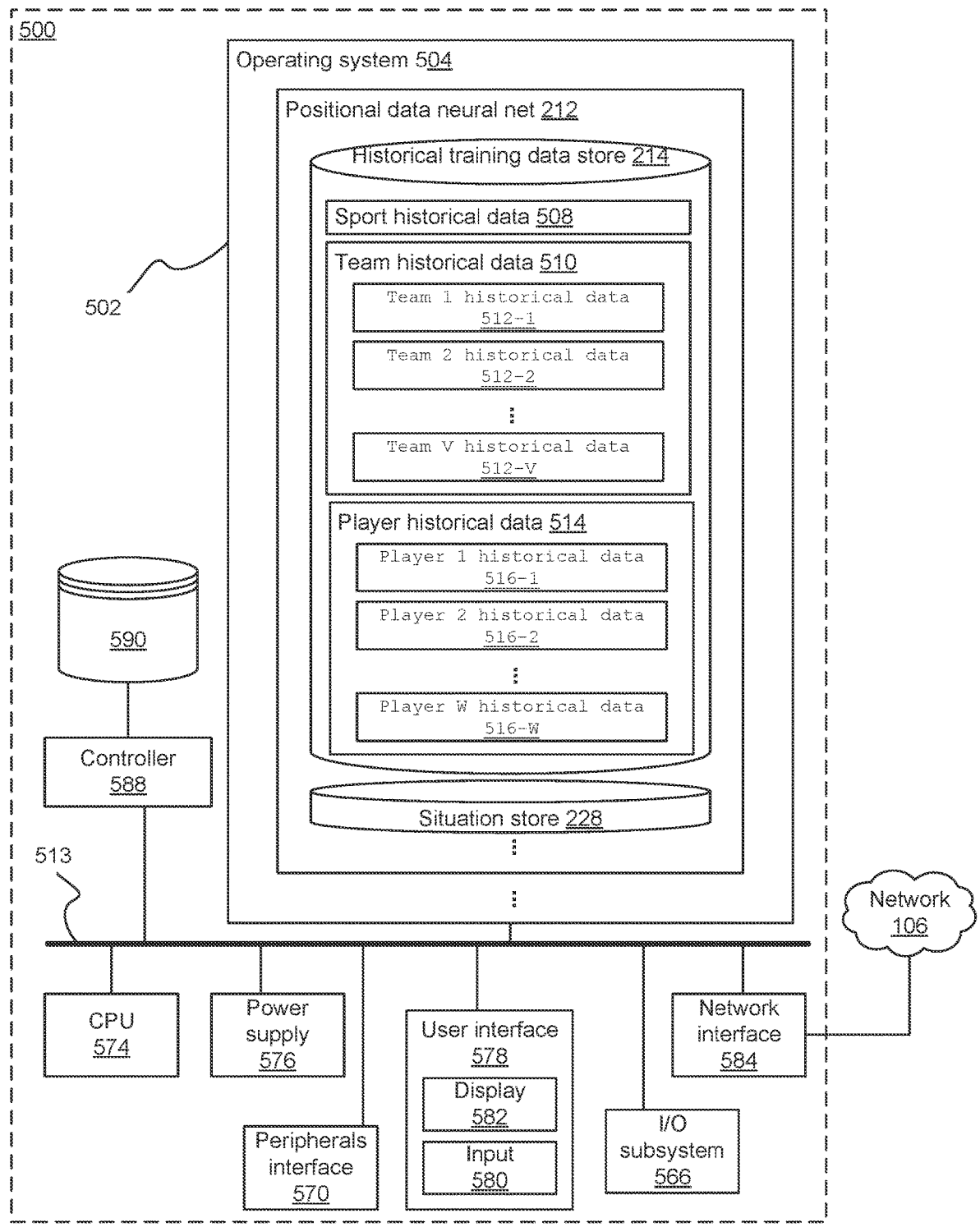
FIG. 10 is a block diagram illustrating an embodiment of a statistics system.

FIG. 10 is a block diagram illustrating an embodiment of a statistics system. Statistics system 500 stores and determines various statistics in accordance with the present disclosure. The statistics system 500 includes one or more processing units (CPUs) 574, peripherals interface 570, memory controller 588, a network or other communications interface 584, a memory 502 (e.g., random access memory), a user interface 578, the user interface 578 including a display 582 and an input 580 (e.g., a keyboard, a keypad, a touch screen, etc.), input/output (I/O) subsystem 566, one or more communication busses 513 for interconnecting the aforementioned components, and a power supply system 576 for powering the aforementioned components.

In some embodiments, the input 580 is a touch-sensitive display, such as a touch-sensitive surface. In some embodiments, the user interface 578 includes one or more soft keyboard embodiments. The soft keyboard embodiments may include standard (e.g., QWERTY) and/or non-standard configurations of symbols on the displayed icons.

It should be appreciated that statistics system 500 is only one example of a system that may be used in staring and determining various statistics, and that statistics system 500 optionally has more or fewer components than shown, optionally combines two or more components, or optionally has a different configuration or arrangement of the components. The various components shown in FIG. 10 are implemented in hardware, software, firmware, or a combination thereof, including one or more signal processing and/or application specific integrated circuits.

Memory 502 optionally includes high-speed random access memory and optionally also includes non-volatile memory, such as one or more magnetic disk storage devices, flash memory devices, or other non-volatile solid-state memory devices. Access to memory 502 by other components of the statistics system 500, such as CPU(s) 574 is, optionally, controlled by memory controller 588.

Peripherals interface 570 can be used to couple input and output peripherals of the management system to CPU(s) 574 and memory 502. The one or more processors 574 run or execute various software programs and/or sets of instructions stored in memory 502 to perform various functions for the statistics system 500 and to process data.

In some embodiments, peripherals interface 570, CPU(s) 574, and memory controller 588 are, optionally, implemented on a single chip. In some other embodiments, they are, optionally, implemented on separate chips.

In some embodiments, power system 576 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 10, memory 502 of the remote user device preferably stores:

an operating system 504 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;

a positional formation classifier 212 for determining and analyzing formations of players;

a historical training data store 214 for storing various statistics related to each sport 508, wherein each sport 508 including various team historical data 510 for one or more teams 512, as well as various player statistics 514 for one or more players 516; and a situational store 228 for storing data related to formations of players and game situations.

The positional formation classifier 212 (sometimes simply called a formation classifier) provides information related to various states and formations of players at any given point of time in game. For instance, in some embodiments the formation classifier 212 parses telemetry data 230 in order to determine pre-snap formations. Accordingly, once a formation is determined and telemetry data 230 is parsed, sub-categories of the formation may be determined (e.g., an I-formation with different sub-categories defining different running backs). Moreover, in some embodiments the formation classifier 212 acts as a virtual referee and determines if infractions have occurred within a game or play, such as a player being off-sides, a neutral zone infraction, an illegal motion, an illegal formation, and the like. In some embodiments, the formation classifier 212 includes one or more tables of various formations in a football game, such as a first table of offensive formations, a second table of defensive formations, and a third table of special teams formations. In some embodiments, the above table of formations provides some or all of the formations described by Table 2, Table 3, and Table 4.

TABLE 2

| Exemplary Offensive Football Formations |
|---|
| Exemplary Formation |
| Double wing formation |
| Empty backfield formation |
| Goal line formation |
| I formation |
| Pistol formation |
| Pro set formation |
| Short punt formation |
| Shotgun formation |
| Single set back formation |
| Single wing formation |
| T formation |
| Tackle spread formation |
| V formation |
| Victory formation |
| Wing T formation |
| Wishbone formation |

TABLE 3

Exemplary Defensive Football Formations
Exemplary Formation 38 formation
46 formation
2-5 formation
3-4 formation
4-3 formation
4-4 formation
5-2 formation
5-3 formation
6-1 formation
6-2 formation
Seven-man line formation
Nickle formation
Dime formation
Quarter formation
Half dollar formation

TABLE 4

Exemplary Special Teams Football Formations
Exemplary Formation

Field goal formation
Kick return formation
Kickoff formation
Punt formation

Additionally, in some embodiments the formation classifier 212 determines a ball carrier by comparing telemetry data 230 provided by the ball and telemetry data of a player that is closest to the ball. Likewise, in some embodiments determining which team has possession of the ball is conducted in a similar manner. Furthermore, in some embodiments the formation classifier 212 determines if a player is within a boundary of a game by analyses the telemetry data 230 extracted from the player and comparing this with the known boundaries of the field of play. In this way, the formation classifier 212 parses telemetry data 230 to provide a box score and/or automatic color commentary of a game.

While the formation classifier 212 is labeled a "neural net" it will be appreciated that the formation classifier 212 module does not have to perform classification of team formation using a neural network classifier. In some embodiments the formation classifier 212 module does in fact make use of any classification scheme that can discern a team formation from telemetry data. For instance, in some embodiments formation classifier 212 makes use of a nearest neighbor algorithm to perform the classification of team formation. In other embodiments formation classifier 212 makes use of clustering to perform the classification of team formation. In some embodiments the elucidation of the formation class by formation classifier 212 is used as a covariate in statistical models that predict the outcome of a current live game (e.g., win/loss, point spread, etc.) as disclosed with respect to methods and features described with respect to FIGS. 2 and 3.

In more detail, in some embodiments, the formation classifier 212 is based on a logistic regression algorithm, a neural network algorithm, a support vector machine (SVM) algorithm, a Naive Bayes algorithm, a nearest-neighbor algorithm, a boosted trees algorithm, a random forest algorithm, or a decision tree algorithm.

By way of non-limiting example the formation classifier 212 is based on a logistic regression algorithm, a neural network algorithm, a support vector machine (SVM) algorithm, a Naive Bayes algorithm, a nearest-neighbor algorithm, a boosted trees algorithm, a random forest algorithm, or a decision tree algorithm. When used for classification, SVMs separate a given set of binary labeled data training set with a hyper-plane that is maximally distant from the labeled data. For cases in which no linear separation is possible, SVMs can work in combination with the technique of 'kernels', which automatically realizes a non-linear mapping to a feature space. The hyper-plane found by the SVM in feature space corresponds to a non-linear decision boundary in the input space. Tree-based methods partition the feature space into a set of rectangles, and then fit a model (like a constant) in each one. In some embodiments, the decision tree is random forest regression. One specific algorithm that can serve as the formation classifier 212 for the instant methods is a classification and regression tree (CART). Other specific decision tree algorithms that can serve as the formation classifier 212 for the instant methods include, but are not limited to, ID3, C4.5, MART, and Random Forests.

In some embodiments, the historical data store 214 stores statistics related to each sport 508, each team 510 within the sport league, as well as the respective players 512. As previously described, in some embodiments the data stored in the historical data store 214 is utilized as a training set of data for machine learning engine 210 and/or formation classifier 212. For instance, in some embodiments the data stored in the historical data store 214 is utilized as an initial data set at a start of a league, as in inferred from other data sets of similar league (e.g., using college football stats if a player is a professional rookie), or utilized to create data points if a new statistic is being generated (e.g., a previously unknown statistic becomes relevant). Furthermore, in some embodiments data from a previously played game is stored within the historical data store 214.

In some embodiments, the situation store 228 includes data stored in one or more databases of the machine learning engine 210 as a cache of information. This cache of the situation store 228 allows for data to be queried for and utilized rapidly, rather than having to query each respective database. In some embodiments, the situation store 288 creates a new cache of data for each respective game. However, the present disclosure is not limited thereto.

Figure 11:
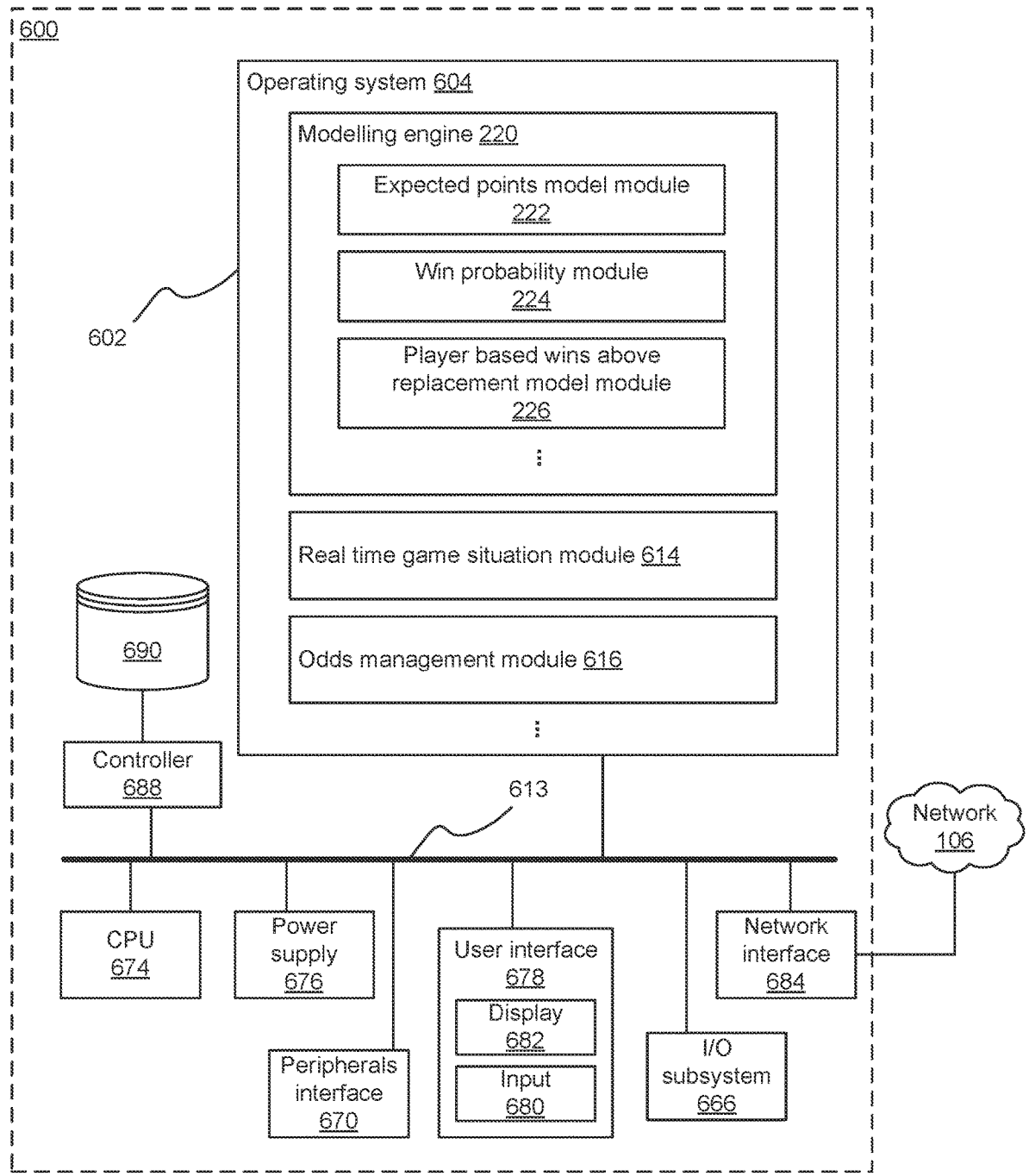
FIG. 11 is a block diagram illustrating an embodiment of an odds management system.

FIG. 11 is a block diagram illustrating an embodiment of an odds management system. Odds management system 600 stores and determines various odds in accordance with the present disclosure. The odds management system 600 includes one or more processing units (CPUs) 674, peripherals interface 670, memory controller 688, a network or other communications interface 684, a memory 602 (e.g., random access memory), a user interface 678, the user interface 678 including a display 682 and an input 680 (e.g., a keyboard, a keypad, a touch screen, etc.), input/output (I/O) subsystem 666, one or more communication busses 613 for interconnecting the aforementioned components, and a power supply system 676 for powering the aforementioned components.

In some embodiments, the input 680 is a touch-sensitive display, such as a touch-sensitive surface. In some embodiments, the user interface 778 includes one or more soft keyboard embodiments. The soft keyboard embodiments may include standard (QWERTY) and/or non-standard configurations of symbols on the displayed icons.

It should be appreciated that odds management system 600 is only one example of a system that may be used in staring and determining various statistics, and that the odds management system 600 optionally has more or fewer components than shown, optionally combines two or more components, or optionally has a different configuration or arrangement of the components. The various components shown in FIG. 11 are implemented in hardware, software, firmware, or a combination thereof, including one or more signal processing and/or application specific integrated circuits.

Memory 602 optionally includes high-speed random access memory and optionally also includes non-volatile memory, such as one or more magnetic disk storage devices, flash memory devices, or other non-volatile solid-state memory devices. Access to memory 602 by other components of the odds management system 600, such as CPU(s) 674 is, optionally, controlled by memory controller 688.

Peripherals interface 670 can be used to couple input and output peripherals of the management system to CPU(s) 674 and memory 602. The one or more processors 674 run or execute various software programs and/or sets of instructions stored in memory 602 to perform various functions for the odds management system 600 and to process data.

In some embodiments, peripherals interface 670, CPU(s) 674, and memory controller 688 are, optionally, implemented on a single chip. In some other embodiments, they are, optionally, implemented on separate chips.

In some embodiments, power system 676 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 11, memory 602 of the remote user device preferably stores:

an operating system 604 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;

a modelling engine 200 for storing one or more prediction or outcome models, the modelling engine including:
an expected points model module 222 for determining an expected points value of a scenario in a game,
a win probability model 224 for determining a probably of winning a game, and
a player based wins above replacement model module 226 for determining;

a real time game situation module 614 for receiving and communicating information related to a game currently being conducted; and an odds management module 616 for facilitation management of various odds and betting systems.

As previously described, the modelling engine 200 includes various algorithms and models utilized for generating statistics and predicting outcomes at a sports event. In some embodiments, these models include the expected points model 222 that provides a numerical value for each play of a game. For instance, if a drive in a game that results in a touchdown has plays that include a 5-yard rush, a 94-yard pass, and a 1-yard rush, even though the 1-yard rush resulted in the touchdown the 94-yard pass has a much more significant role in the drive. Thus, in some embodiments the 5-yard rush is allocated an expected points value of 0.5, the 94-yard pass is allocated an expected points value of 5.5, and the 1-yard rush is allocated an expected points value of 1, with high values indicating more important or game defining plays. In some embodiments modelling engine 200 uses the telemetry data collected in accordance with the present disclosure to predict the outcome of a game (e.g., win/loss, point spread, etc.) as disclosed with respect to methods and features described with respect to FIGS. 2 and 3.

In some embodiments, the real time game situation module 614 receives information related to situations occurring in a game. This information is then utilized in adjusting various weights and values in the above described models. For instance, if a quarterback rolls his ankle and has to take every play from a shotgun position, this immobility of the quarterback will be reflected in the game models 220 through the real time game situation module 614.

Figure 12:
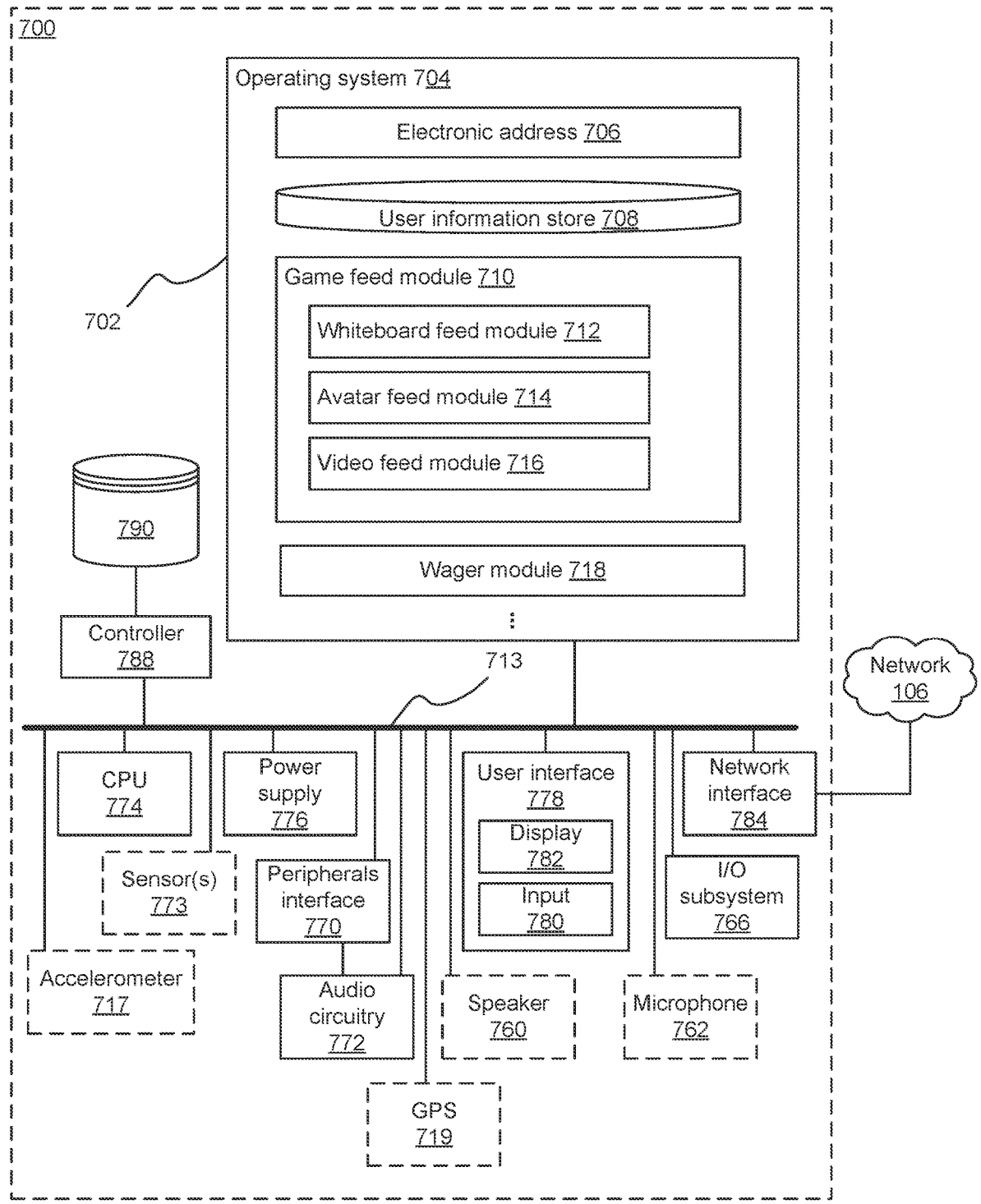
FIG. 12 is a block diagram illustrating an embodiment of a user device.

FIG. 12 is a block diagram illustrating an embodiment of a user device. User device is a remote user device 700 associated with an end user in accordance with the present disclosure. The user device 700 includes one or more processing units (CPUs) 774, peripherals interface 770, memory controller 788, a network or other communications interface 784, a memory 702 (e.g., random access memory), a user interface 778, the user interface 778 including a display 782 and an input 780 (e.g., a keyboard, a keypad, a touch screen, etc.), input/output (I/O) subsystem 766, an optional accelerometer 717, an optional GPS 719, optional audio circuitry 772, an optional speaker 760, an optional microphone 762, one or more optional sensors 764 such as for detecting intensity of contacts on the user device 700 (e.g., a touch-sensitive surface such as a touch-sensitive display system of the device 700) and/or an optical sensor, one or more communication busses 713 for interconnecting the aforementioned components, and a power supply system 776 for powering the aforementioned components.

In some embodiments, the input 780 is a touch-sensitive display, such as a touch-sensitive surface. In some embodiments, the user interface 778 includes one or more soft keyboard embodiments. The soft keyboard embodiments may include standard (QWERTY) and/or non-standard configurations of symbols on the displayed icons.

It should be appreciated that the user device 700 is only one example of a device of a multifunction device that may be used by end users, and that the user device 700 optionally has more or fewer components than shown, optionally combines two or more components, or optionally has a different configuration or arrangement of the components. The various components shown in FIG. 12 are implemented in hardware, software, firmware, or a combination thereof, including one or more signal processing and/or application specific integrated circuits.

Memory 702 optionally includes high-speed random access memory and optionally also includes non-volatile memory, such as one or more magnetic disk storage devices, flash memory devices, or other non-volatile solid-state memory devices. Access to memory 702 by other components of the user device 700, such as CPU(s) 774 is, optionally, controlled by memory controller 788.

Peripherals interface 770 can be used to couple input and output peripherals of the management system to CPU(s) 774 and memory 702. The one or more processors 774 run or execute various software programs and/or sets of instructions stored in memory 702 to perform various functions for the user device 700 and to process data.

In some embodiments, peripherals interface 770, CPU(s) 774, and memory controller 788 are, optionally, implemented on a single chip. In some other embodiments, they are, optionally, implemented on separate chips.

In some embodiments, audio circuitry 772, speaker 760, and microphone 762 provide an audio interface between a user and the device 700. The audio circuitry 772 receives audio data from peripherals interface 770, converts the audio data to an electrical signal, and transmits the electrical signal to speaker 760. Speaker 760 converts the electrical signal to human-audible sound waves. Audio circuitry 772 also receives electrical signals converted by microphone 762 from sound waves. Audio circuitry 772 converts the electrical signal to audio data and transmits the audio data to peripherals interface 770 for processing. Audio data is, optionally, retrieved from and/or transmitted to memory 702 and/or RF circuitry 784 by peripherals interface 770.

In some embodiments, power system 776 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 12, memory 702 of the remote user device preferably stores:
- an operating system 704 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;
- an electronic address 706 that is used to identify a particular user device during communications with various systems and devices of the present disclosure;
- a user information store 708 that stores pertaining information related to the respective user associated with the corresponding user device 700, such as user access information including usernames, user passwords, access tokens, etc.;
- a game feed module 710 for viewing various representations of a game including a whiteboard feed module 712, an avatar feed module 714, and a video feed module 716 as well as viewing various statistics related to the game; and
- a wager module 718 that facilitates placing wagers on game scenarios.

In some embodiments wager module 718 uses the telemetry data collected in accordance with the present disclosure to predict the outcome of a current game using extended covariants (e.g., win/loss, point spread, etc.), as disclosed with respect to methods and features described with respect to FIGS. 2 and 3. In some embodiments, wager module 718 uses the telemetry data collected in accordance with the present disclosure to provide odds for future game events in a current live game.

Figure 13:
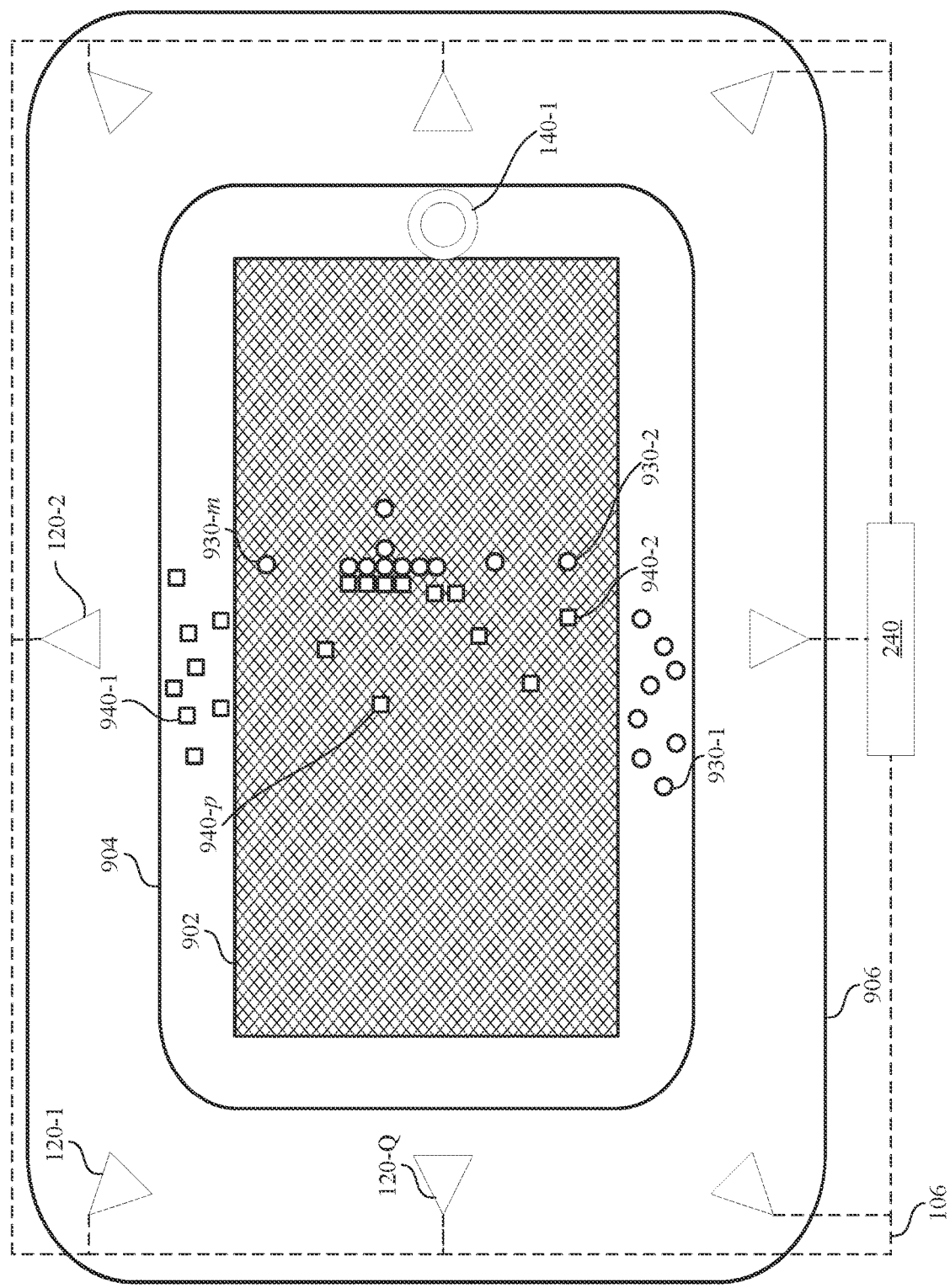
FIG. 13 shows an example environment including a field of play that includes components of a tracking system according to an embodiment of the present disclosure.

FIG. 13 shows an example environment including a field of play that includes components of a tracking system according to an embodiment of the present disclosure. This tracking system can be included in content creators 140 to track and/or capture video of an event. An exemplary environment (e.g., stadium 906) 900. The environment 900 includes a field of play 902 in which a game is played (e.g., a football game). The environment 900 includes a region 904 that includes the field of play 902 and an area immediately surrounding the field of play (e.g., an area that includes subjects not participating in the game such as subject 930-1 and subject 940-1). The environment 900 includes an array of anchor devices 120 (e.g., anchor device 1201-1, anchor device 120-2, ..., anchor device 120-Q) that receive telemetry data from one or more tracking devices 300 associated with a respective subject of the game. As illustrated in FIG. 9, in some embodiments the array of anchor devices is in communication (e.g., via communication network 106) with a telemetry parsing system 240 (e.g., tracker management system 400 of FIG. 9). Moreover, in some embodiments one or more cameras 140 (e.g., camera 140-1) capture images and/or video of the sports event, which is used in forming the virtual reproduction. In FIG. 13, markers 930 represent subjects a first team of the game while markers 940 represents subjects of a second team of the game.

Figure 14:
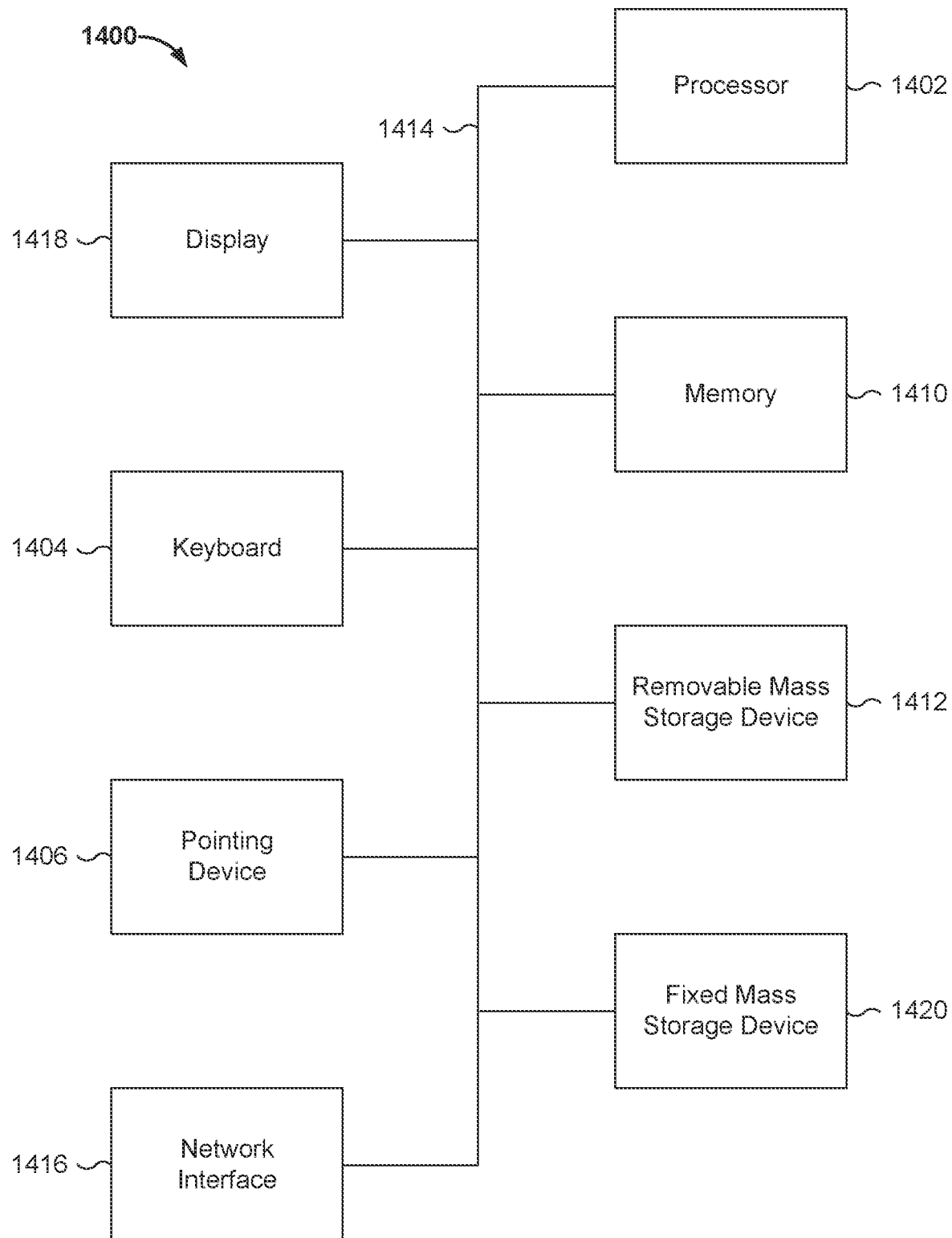
FIG. 14 is a functional diagram illustrating a programmed computer system for customizing and compositing a video feed in accordance with some embodiments.

FIG. 14 is a functional diagram illustrating a programmed computer system for customizing and compositing a video feed in accordance with some embodiments. As will be apparent, other computer system architectures and configurations can be used to perform the described video compositing and customization technique. Computer system 1400, which includes various subsystems as described below, includes at least one microprocessor subsystem (also referred to as a processor or a central processing unit (CPU) 1402). For example, processor 1402 can be implemented by a single-chip processor or by multiple processors. In some embodiments, processor 1402 is a general purpose digital processor that controls the operation of the computer system 1400. In some embodiments, processor 1402 also includes one or more coprocessors or special purpose processors (e.g., a graphics processor, a network processor, etc.). Using instructions retrieved from memory 1410, processor 1402 controls the reception and manipulation of input data received on an input device (e.g., image processing device 1406, I/O device interface 1404), and the output and display of data on output devices (e.g., display 1418).

Processor 1402 is coupled bi-directionally with memory 1410, which can include, for example, one or more random access memories (RAM) and/or one or more read-only memories (ROM). As is well known in the art, memory 1410 can be used as a general storage area, a temporary (e.g., scratch pad) memory, and/or a cache memory. Memory 1410 can also be used to store input data and processed data, as well as to store programming instructions and data, in the form of data objects and text objects, in addition to other data and instructions for processes operating on processor 1402. Also as is well known in the art, memory 1410 typically includes basic operating instructions, program code, data, and objects used by the processor 1402 to perform its functions (e.g., programmed instructions). For example, memory 1410 can include any suitable computer readable storage media described below, depending on whether, for example, data access needs to be bi-directional or uni-directional. For example, processor 1402 can also directly and very rapidly retrieve and store frequently needed data in a cache memory included in memory 1410.

A removable mass storage device 1412 provides additional data storage capacity for the computer system 1400, and is optionally coupled either bi-directionally (read/write) or uni-directionally (read only) to processor 1402. A fixed mass storage 1420 can also, for example, provide additional data storage capacity. For example, storage devices 1412 and/or 1420 can include computer readable media such as magnetic tape, flash memory, PC-CARDS, portable mass storage devices such as hard drives (e.g., magnetic, optical, or solid state drives), holographic storage devices, and other storage devices. Mass storages 1412 and/or 1420 generally store additional programming instructions, data, and the like that typically are not in active use by the processor 1402. It will be appreciated that the information retained within mass storages 1412 and 1420 can be incorporated, if needed, in standard fashion as part of memory 1410 (e.g., RAM) as virtual memory.

In addition to providing processor 1402 access to storage subsystems, bus 1414 can be used to provide access to other subsystems and devices as well. As shown, these can include a display 1418, a network interface 1416, an input/output (I/O) device interface 1404, an image processing device 1406, as well as other subsystems and devices. For example, image processing device 1406 can include a camera, a scanner, etc.; I/O device interface 1404 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 1400. Multiple I/O device interfaces can be used in conjunction with computer system 1400. The I/O device interface can include general and customized interfaces that allow the processor 1402 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 1416 allows processor 1402 to be coupled to another computer, computer network, or telecommunications network using a network connection as shown. For example, through the network interface 1416, the processor 1402 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 1402 can be used to connect the computer system 1400 to an external network and transfer data according to standard protocols. For example, various process embodiments disclosed herein can be executed on processor 1402, or can be performed across a network such as the Internet, intranet networks, or local area networks, in conjunction with a remote processor that shares a portion of the processing. Additional mass storage devices (not shown) can also be connected to processor 1402 through network interface 1416.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 14 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 1404 and display 1418 share the touch sensitive screen component, which both detects user inputs and displays outputs to the user). In addition, bus 1414 is illustrative of any interconnection scheme serving to link the subsystems. Other computer architectures having different configurations of subsystems can also be utilized.

Another example of process to provide customized composite video data with live sports content will now be described.

Figure 15:
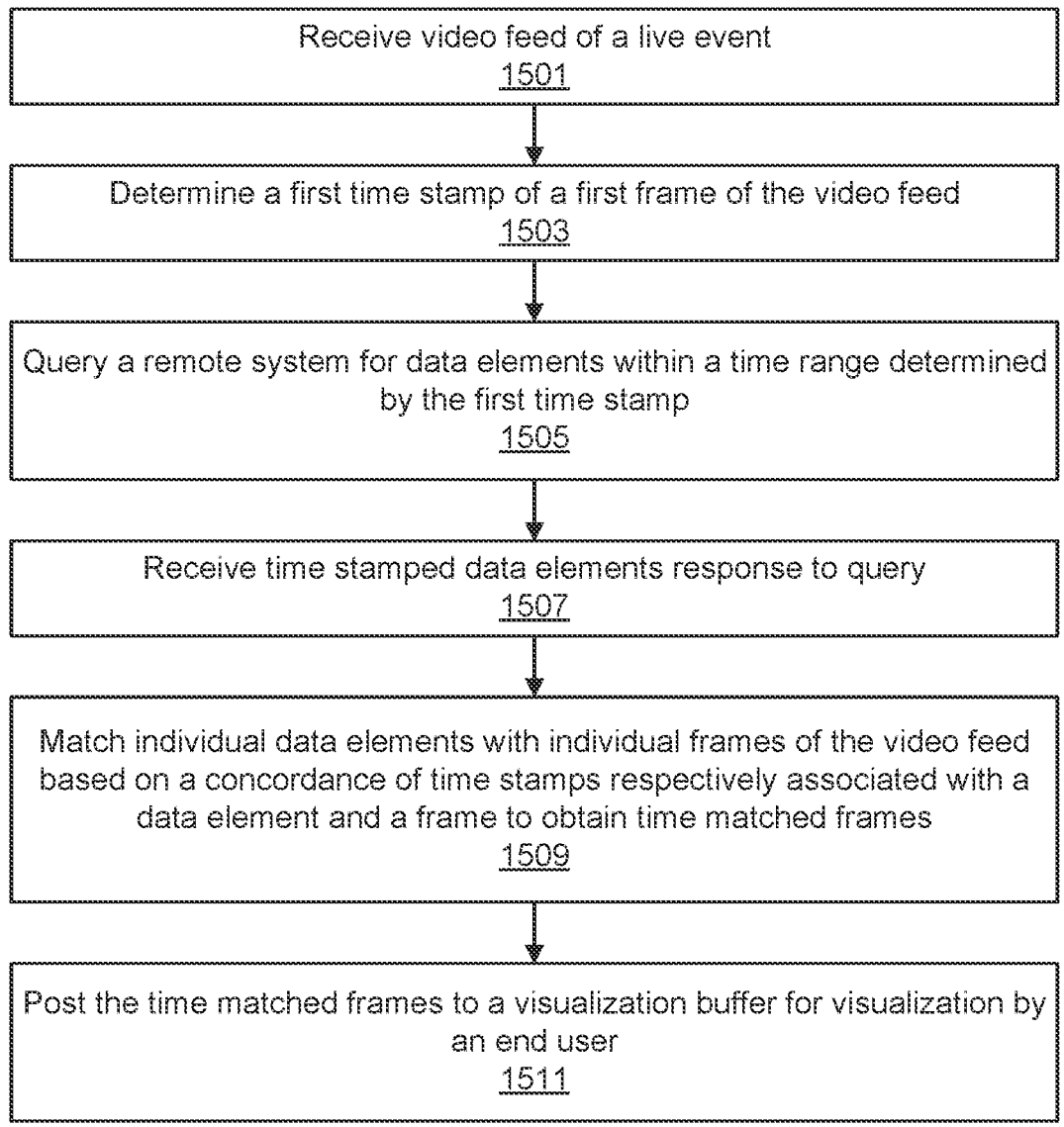
FIG. 15 is a flow chart illustrating an embodiment of a process for customizing and compositing a video feed for live sports.

FIG. 15 is a flow chart illustrating an embodiment of a process for customizing and compositing a video feed for live sports. Each of the steps are like those described in FIG. 2 unless otherwise described.

Referring to block 1501, the process receives a video feed of a live event. For example, the live event involves a game between two players or two teams. In various embodiments, the process receive a background video feed from a remote server. The video feed of the live event can play in the background of a user interface displayed on a client device and is thus called a background video feed.

Referring to block 1503, the process determines a first time stamp of a first frame of the background video feed from time-stamped metadata associated with the first frame. Each frame of the video feed is associated with time-stamped metadata that corresponds to a point in time (e.g., a reference point in time, a local point in time, etc.). In some embodiments, each portion (e.g., graphical/text portion, audio portion) of the video feed is associated with time-stamped metadata. Associating the video feed with time-stamped metadata allows for matching (e.g., synchronization of) data elements from one or more data sources (e.g., game state data elements, game clock data elements, historical data elements, etc.) to be composited (e.g., overlaid) with the video feed and played back in chronological order. Thus, each data element is stored with the timestamped metadata such that during a transmission of a video feed, the data elements can be composited with the video feed as it occurred during the event (including live events).

In accordance with a determination of the time stamp of the respective frame, a query is communicated (e.g., sent) to a computer system (e.g., communicated through an API server for a request for data elements stored by the system shown in FIG. 1). In some embodiments, the query includes (e.g., specifies) a time range limitation. For instance, in some embodiments the query is for one or more data elements stored by the computer system that are within the time range. In some embodiments, the time range is based on the determined time stamp of the respective frame. For instance, in some embodiments the time range is from the time of the determined time stamp to a future point in time (e.g., from the time of the determined time stamp to 10 seconds in the future, 20 seconds in the future, 30 seconds in the future, . . . , 60 seconds in the future, etc.). In some embodiments, the time range is a dynamic time range. For instance, in some embodiments the dynamic time range is dependent upon a bandwidth of a respective user device and/or a bandwidth of the video feed module 716 (e.g., a size and/or bandwidth of the visualization buffer module 720). If a determination is made that the bandwidth of the respective user device 700 and/or the video feed module 716 is relatively low, the dynamic time range is shorted such that the query receives less data in response so as to not overload the user device and/or video feed module.

Referring to block 1505, the process queries a remote system for data elements within a time range determined by the first time stamp. In some embodiments the plurality of data elements includes a plurality of game clock data elements (e.g., an array of game clock elements and associated metadata). In some embodiments, the plurality of data elements includes a plurality of game state data elements (e.g., an array of game state elements and associated metadata). In some embodiments, the plurality of data elements includes a plurality of positional information data elements (e.g., an array of positional information for one or more subjects and associated metadata). In some embodiments, the plurality of data elements includes a plurality of graphical data elements (e.g., a plurality of embedded graphics, a plurality of text data elements such as news and/or weather, and associated metadata). In some embodiments, the plurality of data elements includes a plurality of text data elements (e.g., new articles, weather information, etc.). In some embodiments, respective game state data element is a score of the sporting event at the matching time stamp value. In some embodiments, the plurality of data elements includes a combination of the above described data elements.

In some embodiments, the method further includes using the bandwidth of the client device (e.g., user device 700) to dimension a size of the visualization buffer (e.g., visualization buffer module 720). In some embodiments, the using the bandwidth of the client device to dimension a size of the visualization buffer increases the size of the visualization buffer responsive to a determination in a degradation in the bandwidth. Moreover, the using the bandwidth of the client device to dimension a size of the visualization buffer reduces the size of the visualization buffer responsive to a determination of an improvement in the bandwidth. This dimensioning of a size of the visualization buffer allows for a number of time matched frames to be dynamically posted to the visualization buffer. For instance, in some embodiments decreasing a number of time matched frames posted to the visualization buffer decreases a load on the client device.

Referring to block 1507, the method includes receiving a plurality of data elements from the remote computer system that is responsive to the communicated query. In some embodiments, the plurality of data elements received from the computer system includes the plurality of data elements requested by the query. However, the present disclosure is not limited thereto. For instance, in some embodiments a first plurality of data elements is requested by the query and, accordingly, a second plurality of data elements is received from the computer system (e.g., only a subset of data elements of the first plurality of data elements is available). Nevertheless, in some embodiments each data element that is received in response to the query includes associated time-stamped metadata that falls (e.g., is included) within the specific time range (e.g., the time range is from 1:04 PM to 1:06 PM on a specific day, and, accordingly, the data elements received as a result of the query include metadata that is associated with a time in between 1:04 PM and 1:06 PM of the specific day). In some embodiments, the plurality of data elements is received from one or more data stores of the system (e.g., historical data store 214, situation store 228, etc.). In some embodiments, the plurality of data elements is stored locally on the user device. In some embodiments, the plurality of data elements includes one or more data elements that are stored locally on the user device and one or more data elements that are stored on the computer system (e.g., historical data store 214, situation store 228, etc.).

Referring to block 1509, the process matches individual frames of the video feed based on a concordance of time stamps respectively associated with a data element and a frame to obtain time matched frames. Individual data elements in the plurality of data elements that were received as a result of the query (e.g., communicated through API server 260) are matched with individual frames in the plurality of frames of the video feed. The respective frames and the respective data elements are matched based on a concordance of each time stamp associated with a respective frame in the plurality of frames and each time stamp associated with a respective data element in the plurality of data elements. For instance, with respect to the example set forth in Table 4, each of the array of game clock data elements and the array of game state data elements are received by the user device from the computer system. Using the time stamped metadata associated with each of these arrays of data elements, corresponding game clock data elements, and game state data elements are matched with a respective frame of the video feed that has the same time stamp. This matching obtains a plurality of time matched frames. For instance, a frame of the video feed is determined to have a time stamp of 00:00:06. Accordingly, the corresponding game clock data element and the corresponding game state data element that have an associated timestamped metadata of 00:00:06 are matched with the frame to obtain a time matched frame. Each respective time matched frame in the plurality of time matched frames is overlaid with one or more data elements in the plurality of data elements that time matches the respective time matched frame. In some embodiments, overlaying of the one or more data elements includes compositing an embedded graphic on the video feed (e.g., an embedded scrolling ticker, an embedded score board, an embedded weather status, etc.) In some embodiments, the overlaying includes associating the respective data element with an affordance region, which will be described in more detail infra.

In some embodiments, the matching of individual data elements in the plurality of data elements with individual frames in the plurality of frames based on a concordance of each time stamp associated with a respective frame in the plurality of frames and each time stamp associated with a respective data element in the plurality of data elements includes identifying a respective game clock data element in the plurality of game clock data elements that has a matching time stamp value as the respective frame. The respective game clock data element (e.g., data element 1304-4 of FIG. 17) is overlaid on the respective frame, thereby forming a time matched frame in the one or more time matched frames.

In some embodiments, the matching of individual data elements in the plurality of data elements with individual frames in the plurality of frames based on a concordance of each time stamp associated with a respective frame in the plurality of frames and each time stamp associated with a respective data element in the plurality of data elements includes identifying a respective game state data element in the plurality of game state data elements that has a matching time stamp value as the respective frame. The respective game state data element (e.g., data elements 1304-1, 1304-2, 1304-3, 1304-5, etc.) is overlaid on the respective frame thereby forming a time matched frame in the one or more time matched frames.

In some embodiments, the plurality of data elements includes a plurality of positional information data elements (e.g., telemetry data 230). Each positional information data element in the plurality of positional information data elements is time stamped positional information of one or more players in the first plurality of players or in the second plurality of players. The time stamped position information captured by a telemetry tracking system (e.g., tracker management system 400) at the live event. Accordingly, the matching of individual data elements in the plurality of data elements with individual frames in the plurality of frames based on a concordance of each time stamp associated with a respective frame in the plurality of frames and each time stamp associated with a respective data element in the plurality of data elements includes identifying a respective positional information data element in the plurality of positional information data elements that has a matching time stamp value as the respective frame. The respective positional information data element is overlaid on the respective frame thereby forming a time matched frame in the one or more time matched frames.

In some embodiments, telemetry tracking system (e.g., telemetry management system 400) includes a plurality of tracking devices (e.g., tracking devices 300). Each tracking device is configured to provide a plurality of signals (e.g., telemetry data 230). Each player of the first and second plurality of players is associated with one or more tracking devices in the plurality of tracking devices. Three or more receivers (e.g., anchor devices 120) are configured to receive the signals provided by the plurality of tracking devices. A computer system (e.g., telemetry management system 400 and/or telemetry parsing system 240) is configured to determine, based on the plurality of signals received by the three or more receivers, time stamped positional and/or kinetic information (e.g., positional telemetry 232, kinetic telemetry 234, biometric telemetry 236) for each player of the first and second plurality of players. This determining constructs the plurality of positional information data elements.

In some embodiments, the overlaying of one or more data elements for a respective time matched frame in the plurality of time matched frames further includes associating the respective time matched frame with a corresponding affordance region within an application running on the client device. For instance, in some embodiments if a data element includes a graphic (e.g., an embedded graphic) an affordance region is associated with the graphic. Each affordance region is configured to enable an end user of the respective user device 700 to interact with the respective data element. For instance, in some embodiments if an end user interacts with (e.g., provides a touch input through input 780 of the respective user device 700) an affordance region associated with a respective data element a decision is made in accordance with the interaction. In some embodiments, the decision is to display a menu (e.g., a menu, or selection, of statistics, a menu of a season results of a team, etc.) For instance, in some embodiments if an end user interaction with data element 210 of FIG. 10, a menus depicting a selection of statistics related to the respective subject is displayed on the user device (e.g., overlaid on the video feed). In some embodiments, an interaction by an end user with an overlaid data element alters a visibility state of the data element (e.g., visible, or ON, and invisible, or OFF).

In some embodiments, the matching of a respective frame and one or more respective data elements is conducted within a tolerance in a range of from 0.01 seconds to 0.1 seconds. For example, the matching is conducted within a tolerance of 0.0167 seconds (e.g., 0.60 frames per second). For instance, if a respective frame is determined to have a time stamp of {00 hours:02 minutes:25 seconds:39 milliseconds} and a tolerance of the matching is 5 milliseconds, then each data element that includes associated timestamped metadata in time range of from {00 hours:02 minutes:25 seconds:26 milliseconds} to {00 hours:02 minutes:25 seconds:46 milliseconds} is matched with the respective frame. However, the present disclosure is not limited thereto. For instance, in some embodiments, if a respective frame is determined to have a time stamp of {00 hours 02 minutes:25 seconds:39 milliseconds} and a tolerance of the matching is I 0 milliseconds, then each data element that includes associated timestamped metadata in time range of from {00 hours:02 minutes:25 seconds:39 milliseconds} to {00 hours: 02 minutes:25 seconds:49 milliseconds}. is matched with the respective frame.

Referring to block 1511, the time matched frames, which includes the overlaid data elements, are posted to a visualization buffer (e.g., visualization buffer module 720). As previously described, the visualization buffer provides a queue (e.g., a priority queue) of frames, data elements, and/or time matches frames for composition to form a composited video feed.

In some embodiments, the visualization buffer holds between one second and one minute of time matched frames, including the one or more time matched frames. In some embodiments, the visualization buffer holds between twenty seconds and five minutes of time matched frames, including the one or more time matched frames.

In various embodiments, the process determines one or more data elements based at least in part on the received content. The process generates a composite video feed customized to the one or more user-specific characteristics including by matching at least corresponding portions of the one or more data elements to corresponding portions of the background video feed based at least in part on a concordance of a time stamp of a respective data element and a time stamp of a respective background video frame. The process displays the composite video feed on a display device of the client device, wherein the generated composite video feed includes time-matched frames in which each time-matched frame is overlaid with data elements that time match a respective background video frame.

In various embodiments, the process receives, via the communications interface, content associated with one or more user-specific characteristics, wherein the content includes time-stamped metadata associated with background video frames and data with a time stamp falling within a time range determined by the first time stamp. Different metadata is available to different users based on user profile and/or previous behavior, examples of which are described above.

The following figures show examples of a background video and overlay data elements, where the background video is footage from a live sports event and the overlay data elements are various stats, player information, and the like with which a user (viewer of the live sports event) can interact.

Figure 17:
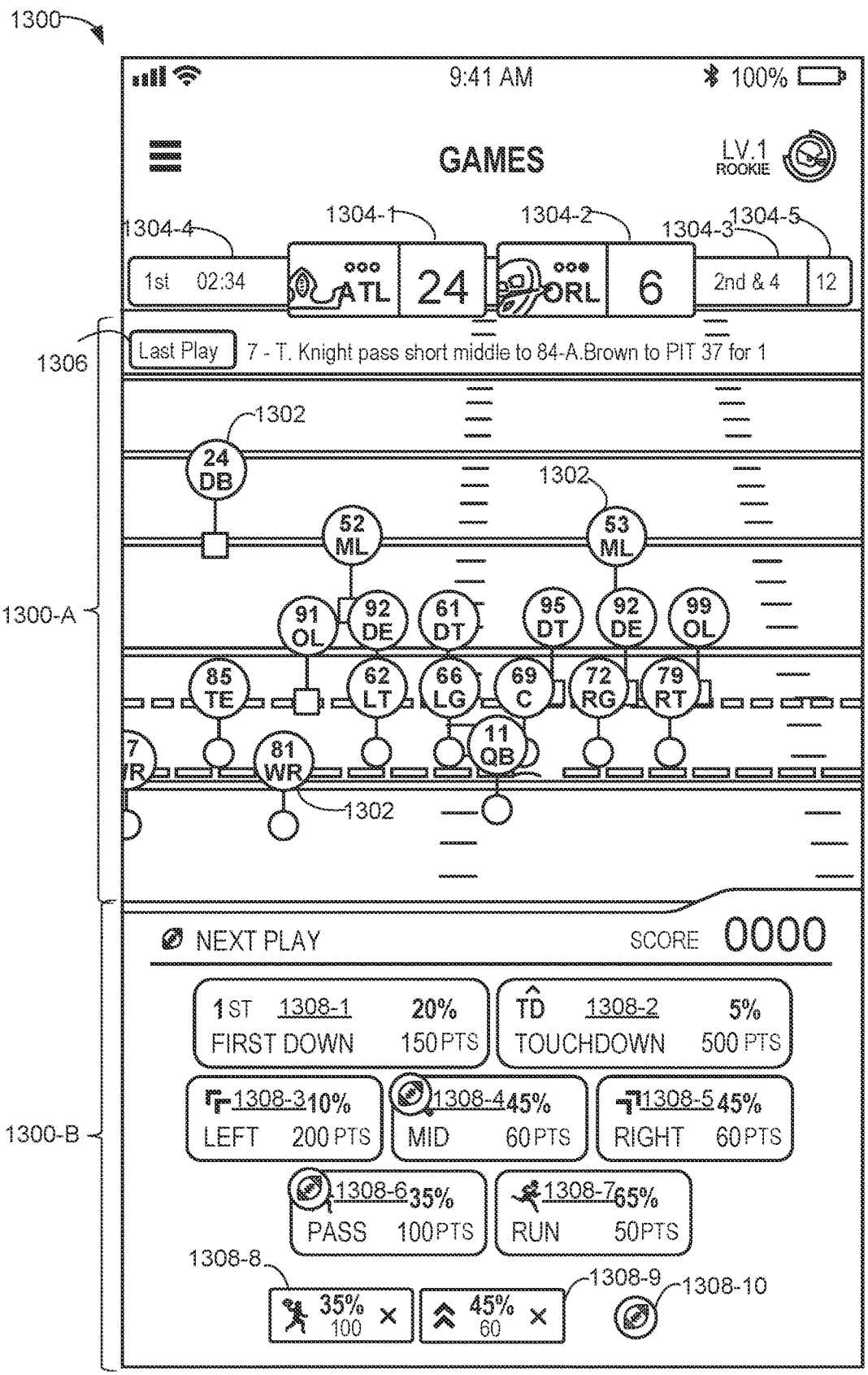
FIG. 17 shows an example of a customized composite video feed for a football game.

FIGS. 16 and 17 show examples of a customized composite video feed for a football game. In some embodiments one or more user preference settings indicate a preference for one or more graphical data elements to be overlaid onto a video feed and/or an orientation or preferring camera of a video feed. For instance, in some embodiments a user preference setting indicates that the user prefers to receive a video feed from a first camera 140-1 (e.g., an all landscape camera view of FIG. 16) instead of a second camera 140-2 (e.g., a partial landscape camera view of FIG. 17). Moreover, in some embodiments a user preference setting indicates a preference to display a graphical data element 1210 that identifies various information related to a respective subject. In some embodiments, a user preference setting indicates a preference to display a graphical data element 1220 that identifies a location of a ball (e.g., positional information of a ball). In some embodiments, a user preference setting indicates a preference to display a graphical data element 1230 that indicates a current ball carrier. In some embodiments, a user preference setting indicates a preference to display a graphical data element 1240 that indicates a path of travel of a subject (e.g., a path of travel of a ball during a play). In some embodiments, a user preference setting indicates a preference to display a graphical data element 1304 that provides game state information such as a game clock data element 1304-4, a play clock data element 1304-5, and/or a game state data element (e.g. elements 1304-1, 1304-2, and/or 1304-3). In some embodiments, a user preference setting indicates a preference to display a graphical data element 1300-B that provides a wagering platform (e.g., wager module 718). In some embodiments, a user preference setting indicates a preference to display a data element 1306 that provides text based information (e.g., weather information, news, etc.). Thus, a user is enabled to personalize and interact with a video feed to tailor the viewing experience to their particular preferences. This also allows for the user device to optimize an amount of data received from the computer system by preventing streams of data a user has indicated no interest in from being communicated unnecessarily.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A client device comprising:
 a communications interface;
 a processor coupled to the communications interface, the processor configured to:
  receive a background video feed from a remote server;
  receive, via the communications interface, content associated with one or more user-specific characteristics, wherein:
   the content associated with the one or more user-specific characteristics is obtained based at least in part on one or more queries to one or more databases for one or more data elements pertaining to a particular time range or frame range of the background video feed; and
   the particular time range or frame range with respect to which the one or more databases is queried is dynamic based at least in part on a bandwidth of the client device;
  determine the one or more data elements based at least in part on the received content, wherein the one or more data elements is interactive and selectable to view branched content;
  generate a composite video feed customized to the one or more user-specific characteristics including by:
   matching at least corresponding portions of the one or more data elements to corresponding portions of the background video feed; and
   overlaying the one or more data elements over the background video feed; and
  display the composite video feed on a display device of the client device.

2. The device of claim 1, wherein:
 the remote server is configured to look up the content based at least in part on the one or more user-specific characteristics; and
 send the content to the device via the communications interface.

3. The device of claim 1, wherein the received content:
 data for output in the composite video feed including at least one of: graphics, text, or audio; and
 metadata associated with how the data is to be output in the composite video feed.

4. The device of claim 1, further comprising the display device, wherein the display device is configured to render the composite video feed.

5. The device of claim 1, wherein the background video feed includes a video feed of a live sporting event.

6. The device of claim 1, wherein the data elements includes at least one of:
 game clock, game state, or positional information.

7. The device of claim 1, wherein:
 the background video feed includes a video feed of a live sporting event between a first team comprising a first plurality of players and a second team comprising a second plurality of players;
 the data elements includes time-stamped positional information data elements associated with one or more players in the first plurality of players or in the second plurality of players, the time-stamped positional information data elements captured by a telemetry tracking system at the live sporting event; and
 matching the data elements to corresponding portions of the background video feed includes:
  identifying a respective positional information data element in the positional information data elements that has a matching time stamp value as a respective frame; and
  overlaying the respective positional information data element on a respective frame thereby forming a time-matched frame in the composite video feed.

8. The device of claim 1, wherein the communications interface is configured to at least one of: periodically request the content and periodically receive portions of the background video feed.

9. The device of claim 1, wherein:
 the data elements includes text; and
 rendering the composite video feed on the display device includes displaying a scroll of the text ticker with the background video feed.

10. The device of claim 9, wherein at least one of: a speed, a direction, refresh rate, exit conditions, and interaction rules of the text ticker scroll is based at least in part on the content received from the remote server.

11. The device of claim 1, wherein the processor is further configured to update at least one of the background video feed or the composite video feed in response to user interaction with the one or more data elements of the composite video feed.

12. The device of claim 1, wherein:
 the background video feed is an advertisement; and
 the determined one or more data elements includes a price customized to a specific user.

13. The device of claim 1, wherein the data element includes audio in a language customized to a specific user.

14. The device of claim 1, wherein the data element includes music customized to a specific user.

15. The client device of claim 1, wherein:
the background video feed includes a video feed of a live sporting event;
at least one of the databases includes information that is processed by a machine learning engine contemporaneous with the live sporting event; and
at least one data element comprises a predicted outcome pertaining to the live sporting event, the predicted outcome being based on at least in part on a machine learning model used by the machine learning engine.

16. A client device comprising:
a communications interface;
a processor coupled to the communications interface, the processor configured to:
    receive a background video feed from a remote server;
    determine a first time stamp of a first frame of the background video feed from time-stamped metadata associated with the first frame;
    receive, via the communications interface, content associated with one or more user-specific characteristics, wherein:
        the content associated with the one or more user-specific characteristics is obtained based at least in part on one or more queries to one or more databases for one or more data elements pertaining to a particular time range or frame range of the background video feed;
        the particular time range or frame range with respect to which the one or more databases is queried is dynamic based at least in part on a bandwidth of the client device;
        the content includes time-stamped metadata associated with background video frames and data with a time stamp falling within a time range determined by the first time stamp;
    determine one or more data elements based at least in part on the received content, wherein the one or more data elements is interactive and selectable to view branched content;
    generate a composite video feed customized to the one or more user-specific characteristics including by:
        matching at least corresponding portions of the one or more data elements to corresponding portions of the background video feed based at least in part on a concordance of a time stamp of a respective data element and a time stamp of a respective background video frame; and
        overlaying the one or more data elements over the background video feed; and
    display the composite video feed on a display device of the client device, wherein the generated composite video feed includes time-matched frames in which each time-matched frame is overlaid with data elements that time match a respective background video frame.

17. A server comprising:
a processor, the processor configured to:
    receive a request for content associated with one or more user-specific characteristics;
    determine content based on the request including by looking up content based at least in part on the request, wherein:
        the content associated with the one or more user-specific characteristics is obtained based at least in part on one or more queries to one or more databases for one or more data elements pertaining to a particular time range or frame range of background video feed that is provided to a client device; and
        the particular time range or frame range with respect to which the one or more databases is queried is dynamic based at least in part on a bandwidth of the client device; and
    send the determined content to a remote client device in response to the content request; wherein the client device generates a composite video feed customized to the one or more user-specific characteristics including by matching data elements to corresponding portions of the background video feed and overlaying the data elements over the background video feed, the data elements being interactive and selectable to view branched content; and
a memory coupled to the processor and configured to store the one or more user-specific characteristics in user profiles.

18. The server of claim 17, wherein the remote client device is configured to determine the data elements based at least in part on the received determined content sent by the server.

19. A method comprising:
receiving a background video feed from a remote server;
requesting content associated with one or more user-specific characteristics;
receiving content from the remote server in response to the content request wherein:
    the content associated with the one or more user-specific characteristics is obtained based at least in part on one or more queries to one or more databases for one or more data elements pertaining to a particular time range or frame range of the background video feed; and
    the particular time range or frame range with respect to which the one or more databases is queried is dynamic based at least in part on a bandwidth of a client device to which the background video feed is provided;
determining data elements based at least in part on the received content, wherein the data elements are interactive and selectable to view branched content;
generating a composite video feed customized to the one or more user-specific characteristics including by matching the data elements to corresponding portions of the background video feed and overlaying the data elements over the background video feed; and
outputting the composite video feed on a display of the client device.

20. A computer program product embodied in a non-transitory computer readable storage medium and comprising computer instructions for:
receiving a background video feed from a remote server;
requesting content associated with one or more user-specific characteristics;
receiving content from the remote server in response to the content request, wherein:
    the content associated with the one or more user-specific characteristics is obtained based at least in part on one or more queries to one or more databases for one or more data elements pertaining to a particular time range or frame range of the background video feed; and
    the particular time range or frame range with respect to which the one or more databases is queried is dynamic based at least in part on a bandwidth of a client device to which the background video feed is provided;

determining data elements based at least in part on the received content, wherein the data elements are interactive and selectable to view branched content;

generating a composite video feed customized to the one or more user-specific characteristics including by matching the data elements to corresponding portions of the background video feed and overlaying the data elements over the background video feed; and outputting the composite video feed on a display of the client device.

\* \* \* \* \*